US010890289B2

(12) United States Patent
Tsuji

(10) Patent No.: US 10,890,289 B2
(45) Date of Patent: Jan. 12, 2021

(54) SUPPORT DEVICE FOR ELECTRONIC EQUIPMENT AND ELECTRONIC EQUIPMENT

(71) Applicant: NEC Platforms, Ltd., Kawasaki (JP)

(72) Inventor: Ryosuke Tsuji, Kanagawa (JP)

(73) Assignee: NEC Platforms, Ltd., Kawasaki (JP)

( * ) Notice: Subject to any disclaimer, the term of this patent is extended or adjusted under 35 U.S.C. 154(b) by 0 days.

(21) Appl. No.: 16/346,149

(22) PCT Filed: Oct. 19, 2017

(86) PCT No.: PCT/JP2017/037807
§ 371 (c)(1),
(2) Date: Apr. 30, 2019

(87) PCT Pub. No.: WO2018/083993
PCT Pub. Date: May 11, 2018

(65) Prior Publication Data
US 2020/0088344 A1 Mar. 19, 2020

(30) Foreign Application Priority Data
Nov. 1, 2016 (JP) ................................. 2016-214133

(51) Int. Cl.
*F16M 13/00* (2006.01)
*F16M 11/10* (2006.01)
(Continued)

(52) U.S. Cl.
CPC .......... *F16M 13/005* (2013.01); *F16M 11/10* (2013.01); *G06F 1/16* (2013.01);
(Continued)

(58) Field of Classification Search
CPC . F16M 11/10; F16M 13/005; F16M 2200/024
See application file for complete search history.

(56) References Cited

U.S. PATENT DOCUMENTS 5,607,135 A * 3/1997 Yamada ............... A47B 23/043
248/447
6,971,622 B2 * 12/2005 Ziegler ................. F16M 11/10
248/454
(Continued)

FOREIGN PATENT DOCUMENTS

JP 10-145052 A 5/1998
JP 2008-115925 A 5/2008
(Continued)

OTHER PUBLICATIONS

Japanese Notification of Reasons for Refusal issued in JP 2016-214133 dated Aug. 3, 2017.
(Continued)

*Primary Examiner* — Eret C McNichols
(74) *Attorney, Agent, or Firm* — Sughrue Mion, PLLC

(57) ABSTRACT

The support device has a mount part 10 for mounting an electronic device, a pair of support leg parts 20, and a pair of cross brace parts 30. The electronic device 600 when mounted on the mount part 10 is supported so as to be slanted rearward. The two support leg parts of the pair of support leg parts 20 are each provided with multiple receiving seats capable of receiving an anchor part of a cross brace part 30 and multiple bowl-shaped hole parts corresponding to the multiple receiving seats. The two cross brace parts of the pair of the cross brace parts 30 are each provided with a biasing stud having a semispherical tip, and when an anchor part is received by any of the receiving seats of the pair of support leg parts 20, the stud enters the bowl-shaped hole part corresponding to the receiving seat. Furthermore, the two cross brace parts of the pair of cross brace parts 30 maintain the angle of the pair of support leg parts 20 with respect to the mount part once the biasing studs have entered the bowl-shaped hole parts as the anchor parts are received by the receiving seats, and the biasing studs in the bowl-
(Continued)

shaped hole parts are pulled out as the anchor parts detach from the receiving seats 201 and slide on inner surfaces of the pair of support leg parts 20 when the support leg parts are turned with respect to the pair of cross brace parts 30.

20 Claims, 17 Drawing Sheets

(51) Int. Cl.
*G06F 1/16* (2006.01)
*H04M 1/04* (2006.01)
*H04M 1/12* (2006.01)
*H04N 5/64* (2006.01)
*H04R 1/32* (2006.01)

(52) U.S. Cl.
CPC ............ *H04M 1/04* (2013.01); *H04M 1/12* (2013.01); *H04N 5/64* (2013.01); *H04R 1/32* (2013.01)

(56) References Cited

U.S. PATENT DOCUMENTS

| | | | |
|---|---|---|---|
| 2009/0152432 A1 | 6/2009 | Kunii et al. | |
| 2010/0288902 A1* | 11/2010 | Liu | F16M 13/00 248/349.1 |
| 2014/0306074 A1 | 10/2014 | Zhang et al. | |
| 2017/0191604 A1* | 7/2017 | Baker | G07G 1/0018 |

FOREIGN PATENT DOCUMENTS

| | | |
|---|---|---|
| JP | 2008-178016 A | 7/2008 |
| JP | 2009-147037 A | 7/2009 |
| JP | 2010-081331 A | 4/2010 |
| JP | 2016-181592 A | 10/2016 |

OTHER PUBLICATIONS

Written Opinion of the International Searching Authority of PCT/JP2017/037807 dated Dec. 12, 2017.
International Search Report of PCT/JP2017/037807 dated Dec. 12, 2017.

* cited by examiner

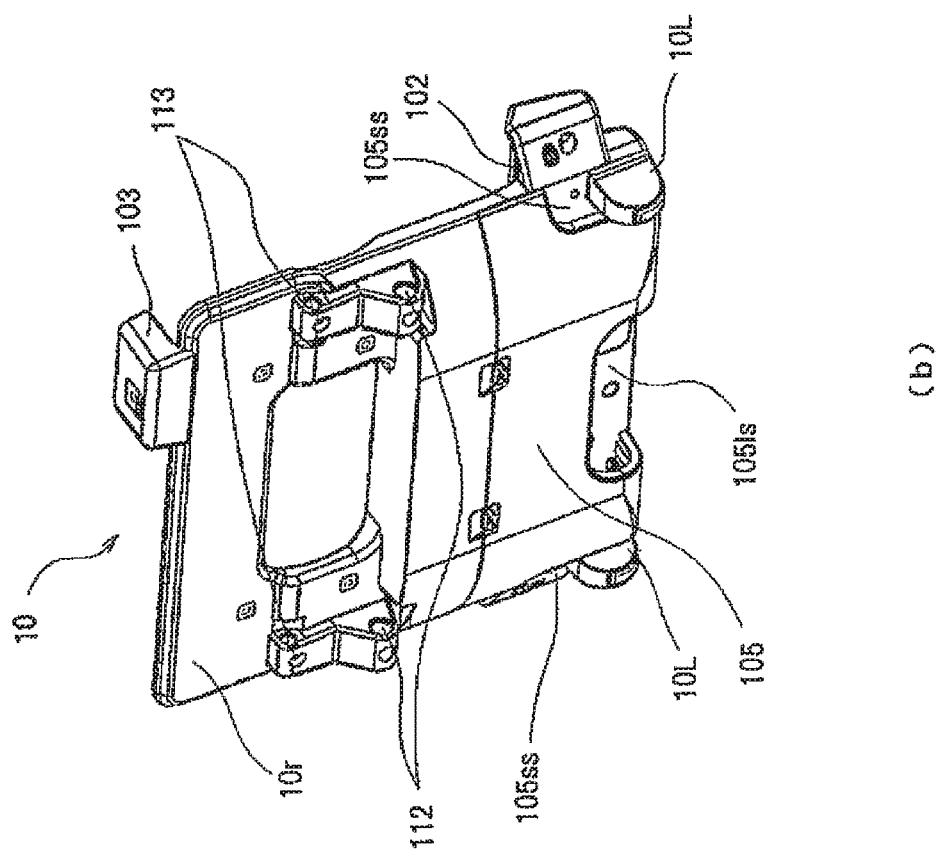
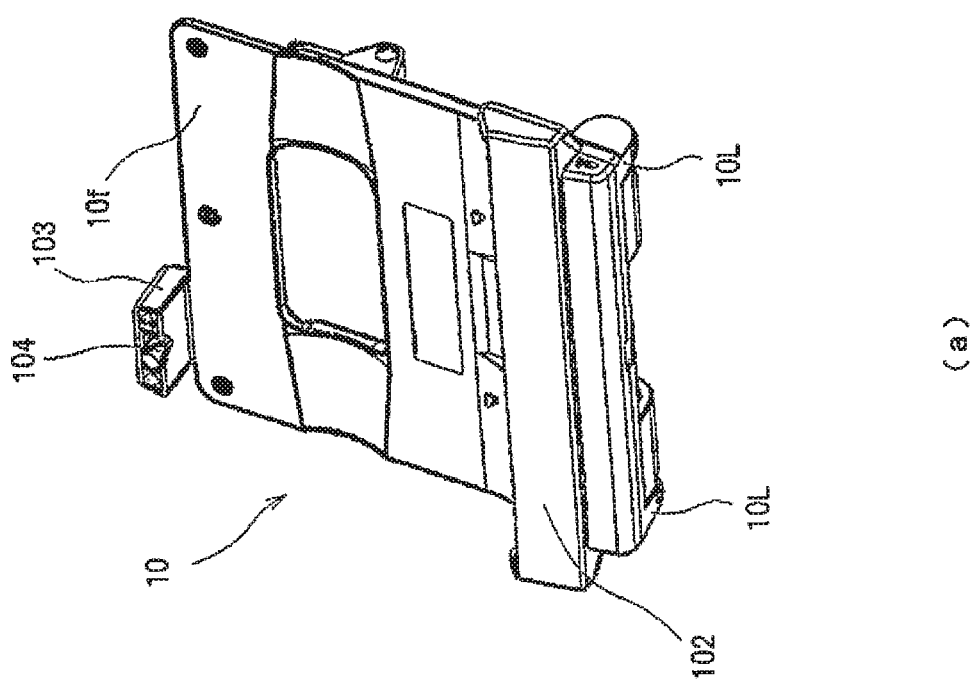
FIG. 11

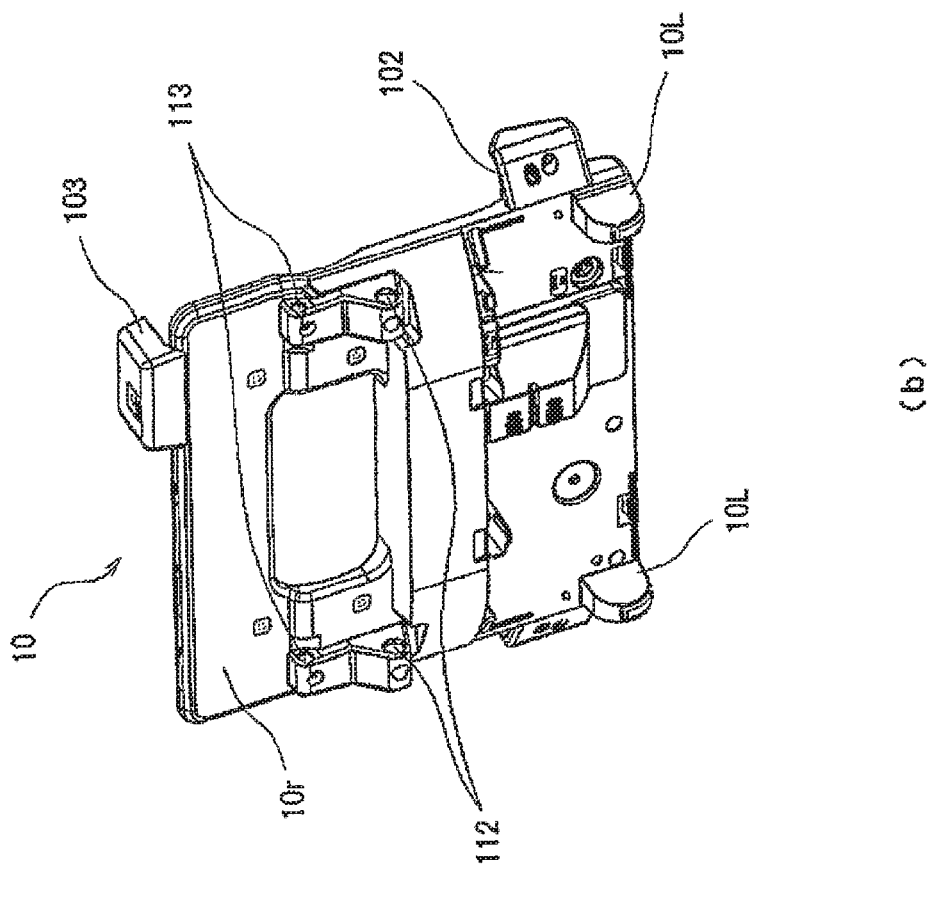
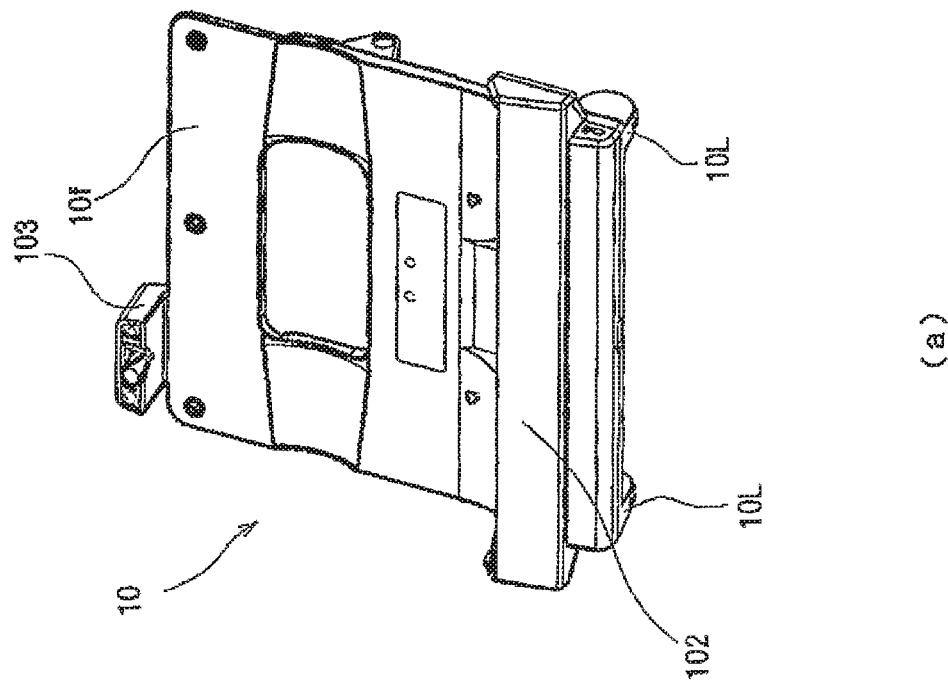
FIG. 12

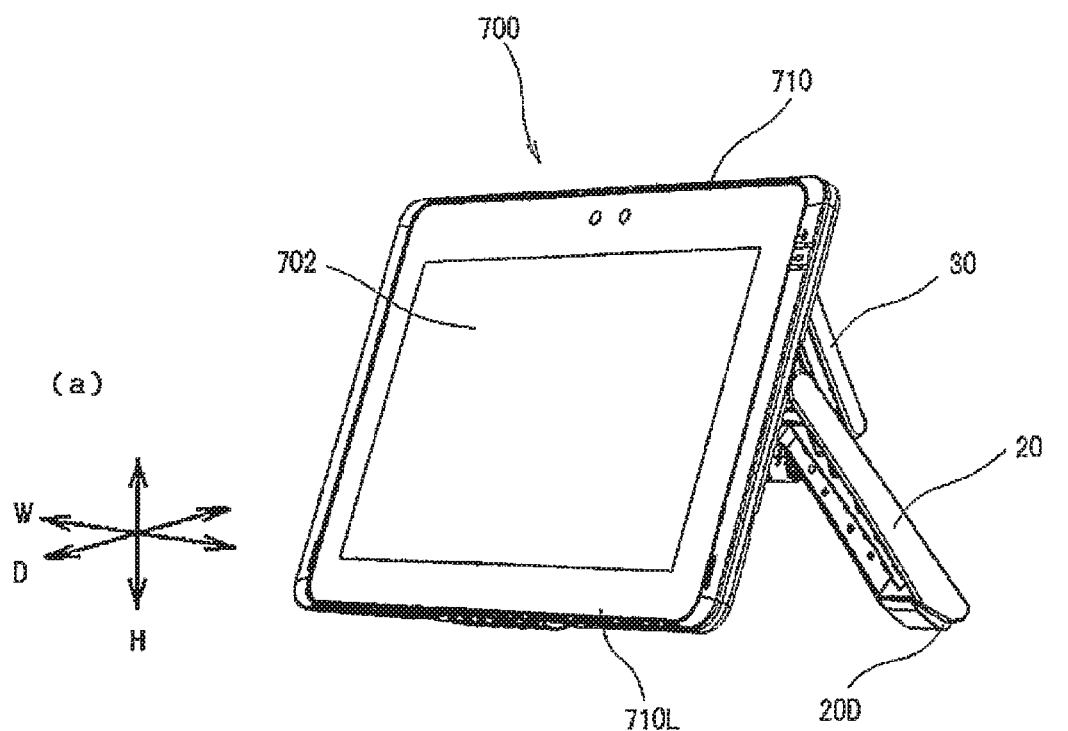
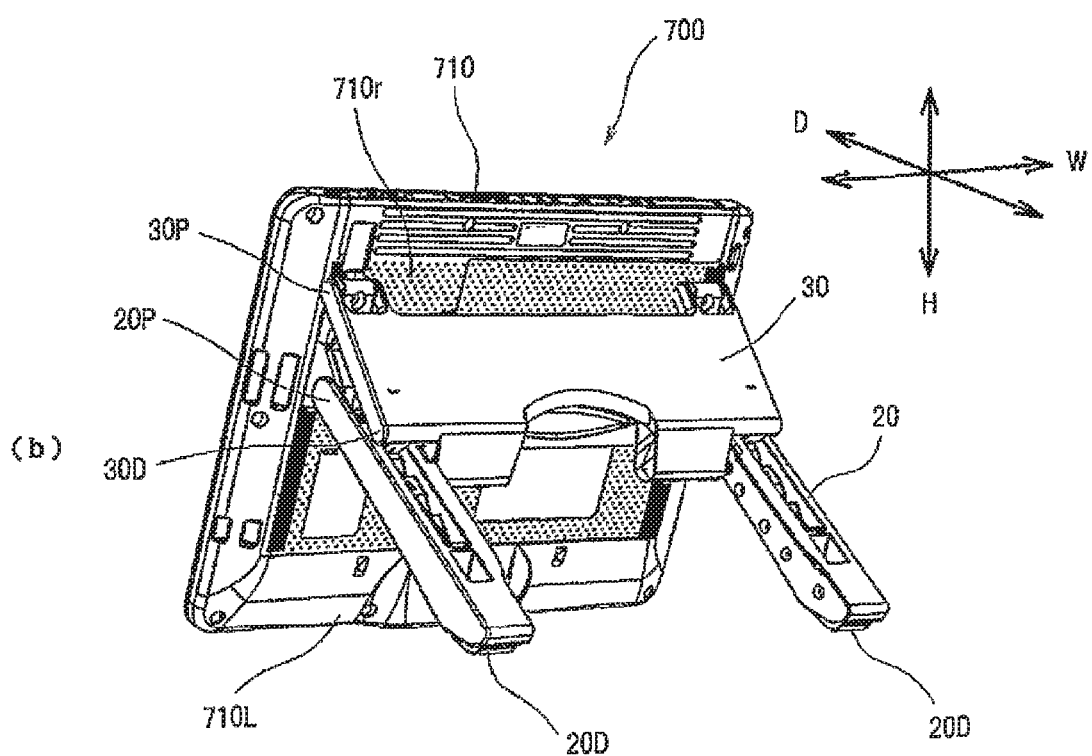
FIG. 17

SUPPORT DEVICE FOR ELECTRONIC EQUIPMENT AND ELECTRONIC EQUIPMENT

CROSS REFERENCE TO RELATED APPLICATIONS

This application is a National Stage of International Application No. PCT/JP2017/037807 filed Oct. 19, 2017, claiming priority based on Japanese Patent Application No. 2016-214133 filed Nov. 1, 2016, the entire disclosures of which are incorporated herein by reference.

TECHNICAL FIELD

This invention relates to a support device for electronic equipment, which is configured to support electronic equipment on a table so that an inclination angle of the electronic equipment is changeable.

BACKGROUND ART

Among various types of electronic equipment, for example, a POS (Point Of Sale) terminal device of a tablet type, which is to be used for a self ordering system as one mode of a POS system, includes an input/output device (user interface) such as a liquid crystal display of a touch panel type.

When such electronic equipment is used on a table, in some cases, there is used a support device configured to support the electronic equipment so that an inclination angle of the electronic equipment is changeable. With the support device, the liquid crystal display of a touch panel type provided to the electronic equipment can be oriented in such a direction that allows a user to visually recognize a screen easily and perform a touching operation easily.

The support device of this type is disclosed in, for example, Patent Document 1. The support device includes a pivotable support leg portion (leg), and a brace portion (support), which is pivotable and is engaged with the support leg portion so as to determine an opening angle of the support leg portion having pivoted. The support device is configured to support the electronic equipment on the table so that the inclination angle of the electronic equipment is changeable. The support device can lay the electronic equipment on the table (the inclination angle is 0 degrees or 180 degrees). The support leg portion includes a plurality of brace receiving seats formed so as to be arrayed in a sawtooth and stepwise shape. The brace portion is selectively engaged with the plurality of brace receiving seats.

PRIOR ART DOCUMENT(S)

Patent Document(s)

Patent Document 1: JP 2009-147037 A

SUMMARY OF THE INVENTION

Problem to be Solved by the Invention

However, in the support device disclosed in Patent Document 1, when the inclination angle of the electronic equipment is to be changed, in order to cancel fitting between the brace receiving seat of the support leg portion and a tip of the brace part, it is required to perform an operation of lifting up, by one hand, the support device connected to the electronic equipment, and causing, by another hand, the support leg portion to pivot in a direction indicated by the arrow of FIG. 4(b) in Patent Document 1. Accordingly, there is still room for improvement in operability.

Therefore, it is an object of this invention to provide a support device for electronic equipment, which is excellent in operability.

It is another object of this invention to provide electronic equipment having a support function, which is excellent in operability.

Means to Solve the Problem

According to one aspect of this invention, there is provided a support device for electronic equipment, comprising a mount portion configured to allow electronic equipment to be removably mounted thereon, paired support leg portions including support leg portions, which are paired with each other in a width direction of the mount portion and are connected to each other, the support leg portions each having a bar-like shape extending from a proximal end to a distal end, the proximal end being mounted to a rear surface of the mount portion so as to be pivotable about a pivot axis extending along the width direction of the mount portion, and paired brace portions including brace portions, which are paired with each other in the width direction of the mount portion and are connected to each other, the brace portions each having a bar-like shape extending from a proximal end to a distal end, the proximal end being mounted to the rear surface of the mount portion so as to be pivotable about a pivot axis extending along the width direction of the mount portion, wherein the support device is configured to support, by a lower end of the mount portion and the distal ends of the support leg portions, the electronic equipment mounted on the mount portion under a state in which the electronic equipment is inclined rearward, wherein the brace portions each include an anchor portion projecting from the distal end, wherein the support leg portions each include a plurality of receiving seats, which intersect a pivoting direction, are formed in an upper surface that is opposed to each of the brace portions, have a recessed shape capable of receiving the anchor portion of each of the brace portions, and are arrayed in a longitudinal direction, and a plurality of bowl-shaped hole portions, which are formed in each of inner side surfaces of the support leg portions that are parallel to the pivoting direction and are opposed to each other, the plurality of bowl-shaped hole portions being arrayed in the longitudinal direction so as to correspond to the plurality of receiving seats, respectively, wherein the brace portions each include a biasing stud that is formed on an outer side surface opposed to the inner side surface of each of the support leg portions and located nearer to the distal end than to the proximal end, projects toward an outer side in the width direction of the mount portion under a state of being biased, and includes a hemispherical tip, wherein, when the anchor portion is received in any one of the plurality of receiving seats of each of the support leg portions, the biasing stud enters the bowl-shaped hole portion corresponding to the receiving seat in which the anchor portion is received, wherein the brace portions are configured to keep an angle of the support leg portions with respect to the mount portion when the anchor portion is received in any one of the plurality of receiving seats of each of the support leg portions and the biasing stud enters the bowl-shaped hole portion corresponding to the receiving seat in which the anchor portion is received, and wherein the brace portions are configured to be capable of changing the angle of the support leg portions with respect to the mount portion when the anchor portion having been received in any one of the plurality of receiving seats of each of the support leg portions is disengaged from the receiving seat along with an operation of causing the paired brace portions to pivot, and the biasing stud having entered the bowl-shaped hole portion is removed from the bowl-shaped hole portion and thus slides on the inner side surface of each of the support leg portions.

According to another aspect of this invention, there is provided an electronic equipment, comprising a casing, paired support leg portions including support leg portions, which are paired with each other in a width direction of the casing and are connected to each other, the support leg portions each having a bar-like shape extending from a proximal end to a distal end, the proximal end being mounted to a rear surface of the casing so as to be pivotable about a pivot axis extending along the width direction of the casing, and paired brace portions including brace portions, which are paired with each other in the width direction of the casing and are connected to each other, the brace portions each having a bar-like shape extending from a proximal end to a distal end, the proximal end being mounted to the rear surface of the casing so as to be pivotable about a pivot axis extending along the width direction of the casing, wherein the support device is configured to support, by a lower end of the casing and the distal ends of the support leg portions, the casing under a state in which the casing is inclined rearward, wherein the brace portions each include an anchor portion projecting from the distal end, wherein the support leg portions each include a plurality of receiving seats, which intersect a pivoting direction, are formed in an upper surface that is opposed to each of the brace portions, have a recessed shape capable of receiving the anchor portion of each of the brace portions, and are arrayed in a longitudinal direction, and a plurality of bowl-shaped hole portions, which are formed in each of inner side surfaces of the support leg portions that are parallel to the pivoting direction and are opposed to each other, the plurality of bowl-shaped hole portions being arrayed in the longitudinal direction so as to correspond to the plurality of receiving seats, respectively, wherein the brace portions each include a biasing stud that is formed on an outer side surface opposed to the inner side surface of each of the support leg portions and located nearer to the distal end than to the proximal end, projects toward an outer side in the width direction of the casing under a state of being biased, and includes a hemispherical tip, wherein, when the anchor portion is received in any one of the plurality of receiving seats of each of the support leg portions, the biasing stud enters the bowl-shaped hole portion corresponding to the receiving seat in which the anchor portion is received, wherein the brace portions are configured to keep an angle of the support leg portions with respect to the casing when the anchor portion is received in any one of the plurality of receiving seats of each of the support leg portions and the biasing stud enters the bowl-shaped hole portion corresponding to the receiving seat in which the anchor portion is received, and wherein the brace portions are configured to be capable of changing the angle of the support leg portions with respect to the casing when the anchor portion having been received in any one of the plurality of receiving seats of each of the support leg portions is disengaged from the receiving seat along with an operation of causing the paired brace portions to pivot, and the biasing stud having entered the bowl-shaped hole portion is removed from the bowl-shaped hole portion and thus slides on the inner side surface of each of the support leg portions.

Effect of the Invention

The support device for electronic equipment according to this invention is excellent in operability.

BRIEF DESCRIPTION OF THE DRAWING

FIG. 11 includes views for illustrating a mount portion in the first embodiment of this invention, (a) being a perspective view when seen from a front side thereof. (b) being a perspective view when seen from a rear side thereof.

FIG. 12 includes views for illustrating the mount portion in the first embodiment of this invention, from which a rear cover is removed, (a) being a perspective view when seen from the front side, (b) being a perspective view when seen from the rear side.

FIG. 17 includes views for illustrating electronic equipment according to a second embodiment of this invention, (a) being a perspective view when seen from a front side thereof, (b) being a perspective view when seen from a rear side thereof.

MODE(S) FOR EMBODYING THE INVENTION

Now, embodiments of this invention are described. In the embodiments described below, as electronic equipment, there is exemplified a POS terminal device of a tablet type to be used for a self ordering system as one mode of a POS system.

First Embodiment

Figure 1:
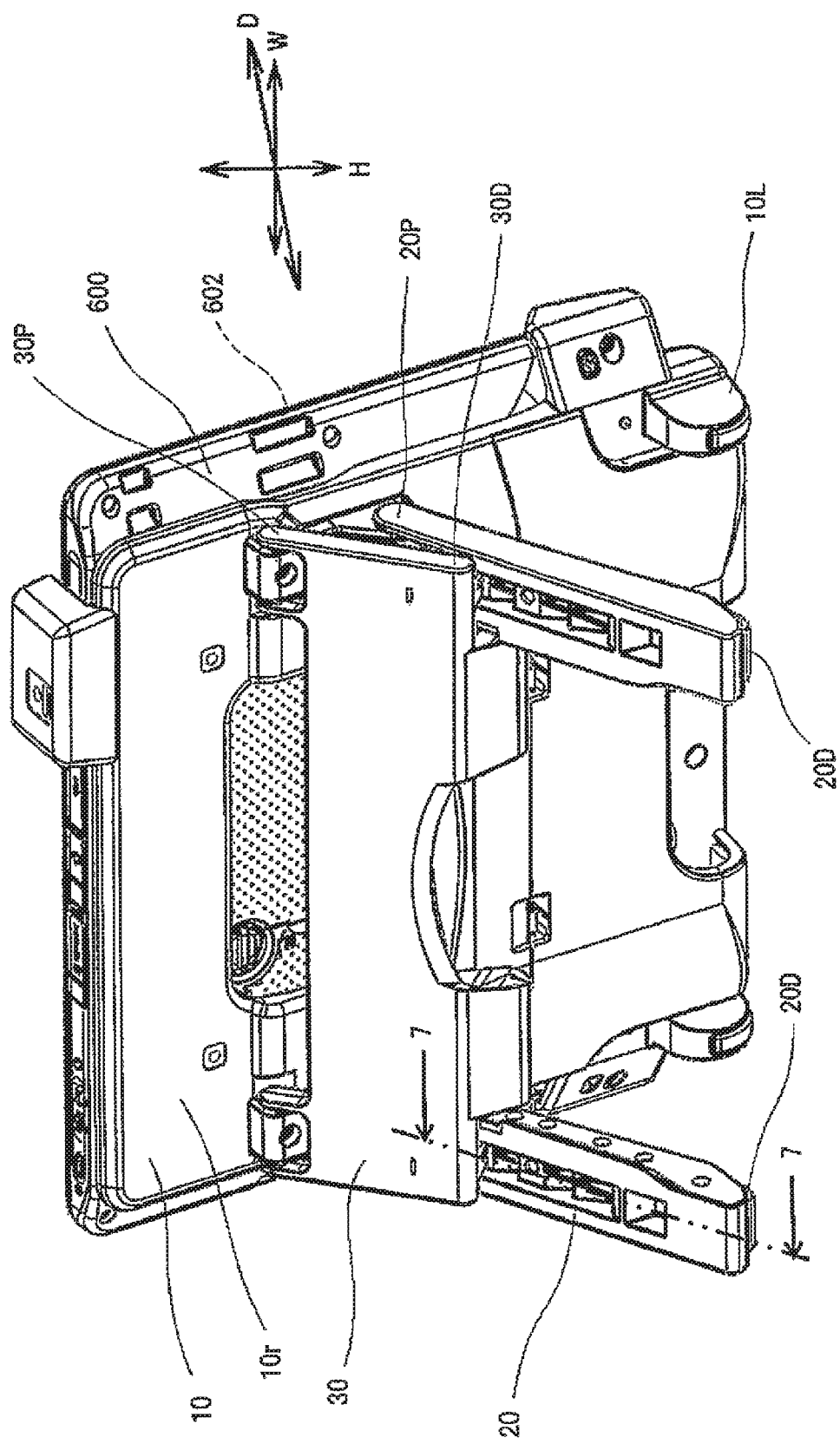
FIG. 1 is a perspective view for illustrating a support device for electronic equipment according to a first embodiment of this invention when seen from a rear side thereof.

With reference to FIG. 1, a support device for electronic equipment according to a first embodiment of this invention includes a mount portion 10, paired support leg portions 20, and paired brace portions 30.

The mount portion 10 is configured to allow electronic equipment 600X including a display 602 (FIG. 10) with a touch panel to be removably mounted thereon.

The paired support leg portions 20 include two support leg portions. The support leg portions are paired with each other in a width direction W of the mount portion 10, and each have a bar-like shape extending from a proximal end 20P to a distal end 20D. The proximal end 20P is mounted to a rear surface 10r of the mount portion 10 so as to be pivotable about a pivot axis extending along the width direction W of the mount portion 10, and the support leg portions are connected to each other in vicinities of the proximal ends 20P. The two support leg portions of the paired support leg portions 20 may be connected to each other in a region between the proximal ends 20P and the distal ends 20D other than the vicinities of the proximal ends 20P.

The paired brace portions 30 include two brace portions. The brace portions are paired with each other in the width direction W of the mount portion 10, and each have a bar-like shape extending from a proximal end 30P to a distal end 30D. The proximal end is mounted to the rear surface 10r of the mount portion 10 so as to be pivotable about a pivot axis extending along the width direction W of the mount portion 10, and the brace portions are connected to each other at portions other than the distal ends 30D. The two brace portions of the paired brace portions 30 may be connected to each other at the distal ends 30D. Alternatively, the two brace portions of the paired brace portions 30 may be connected to each other in a region between the proximal ends 30P and the distal ends 30D.

The support device is configured to support, by lower ends 10L of the mount portion 10 and the distal ends 20D of the paired support leg portions 20, the electronic equipment 600 mounted on the mount portion 10 under a state in which the electronic equipment 600 is inclined rearward in a depth direction D.

Figure 4:
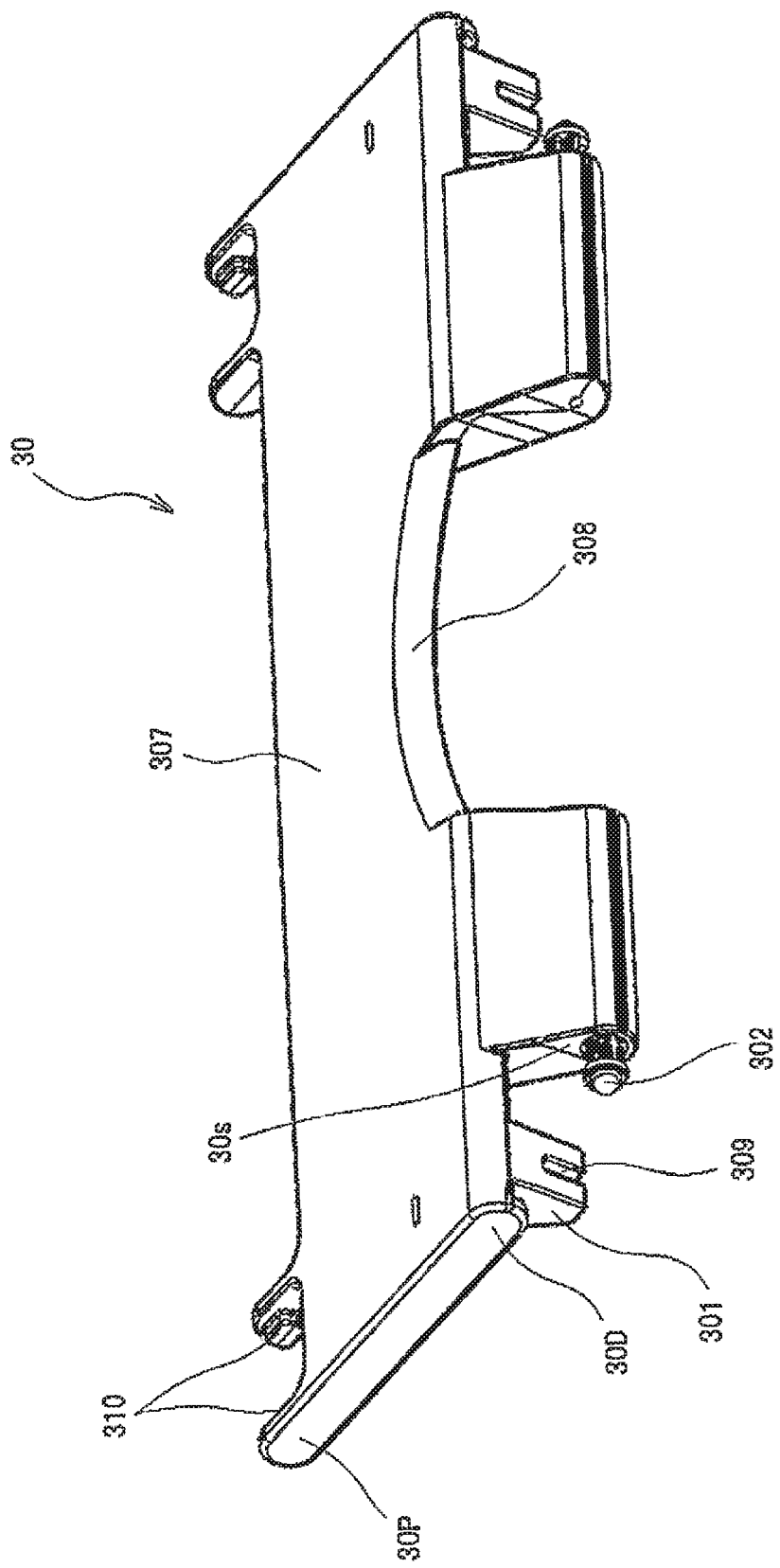
FIG. 4 is a perspective view for illustrating brace portions in the first embodiment and the second embodiment of this invention.

With reference also to FIG. 4, the two brace portions of the paired brace portions 30 each include an anchor portion 301 projecting from the distal end 30D. The anchor portion 301 includes a recessed portion 309. Further, the two brace portions of the paired brace portions 30 each include a brace connection recessed portion 308 and brace pivot shafts 310. The brace connection recessed portion 308 is a recessed portion formed in a brace connection portion 307. The brace pivot shafts 310 serve as the pivot axis for the brace portion. The two brace portions are connected to each other at the brace connection portion 307.

Figure 2:
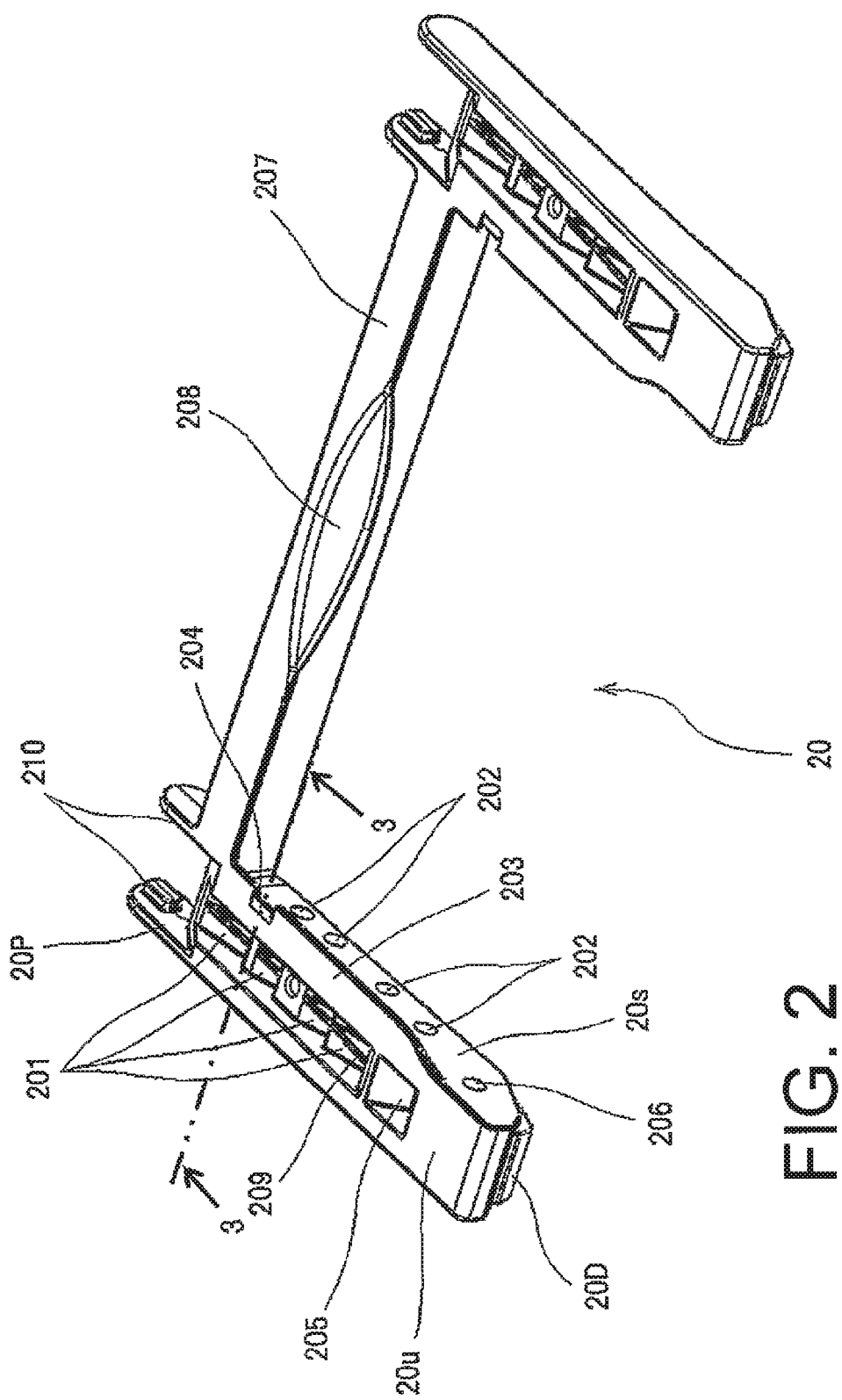
FIG. 2 is a perspective view for illustrating support leg portions in the first embodiment and a second embodiment of this invention.

With reference also to FIG. 2, the two support leg portions of the paired support leg portions 20 each include a plurality of receiving seats 201, a plurality of bowl-shaped hole portions 202, a support leg connection recessed portion 208, and support leg pivot shafts 210. The support leg connection recessed portion 208 is a recessed portion formed in a support leg connection portion 207. The support leg pivot shafts 210 serve as the pivot axis for the support leg portion. The two support leg portions are connected to each other at the support leg connection portion 207.

Figure 7:
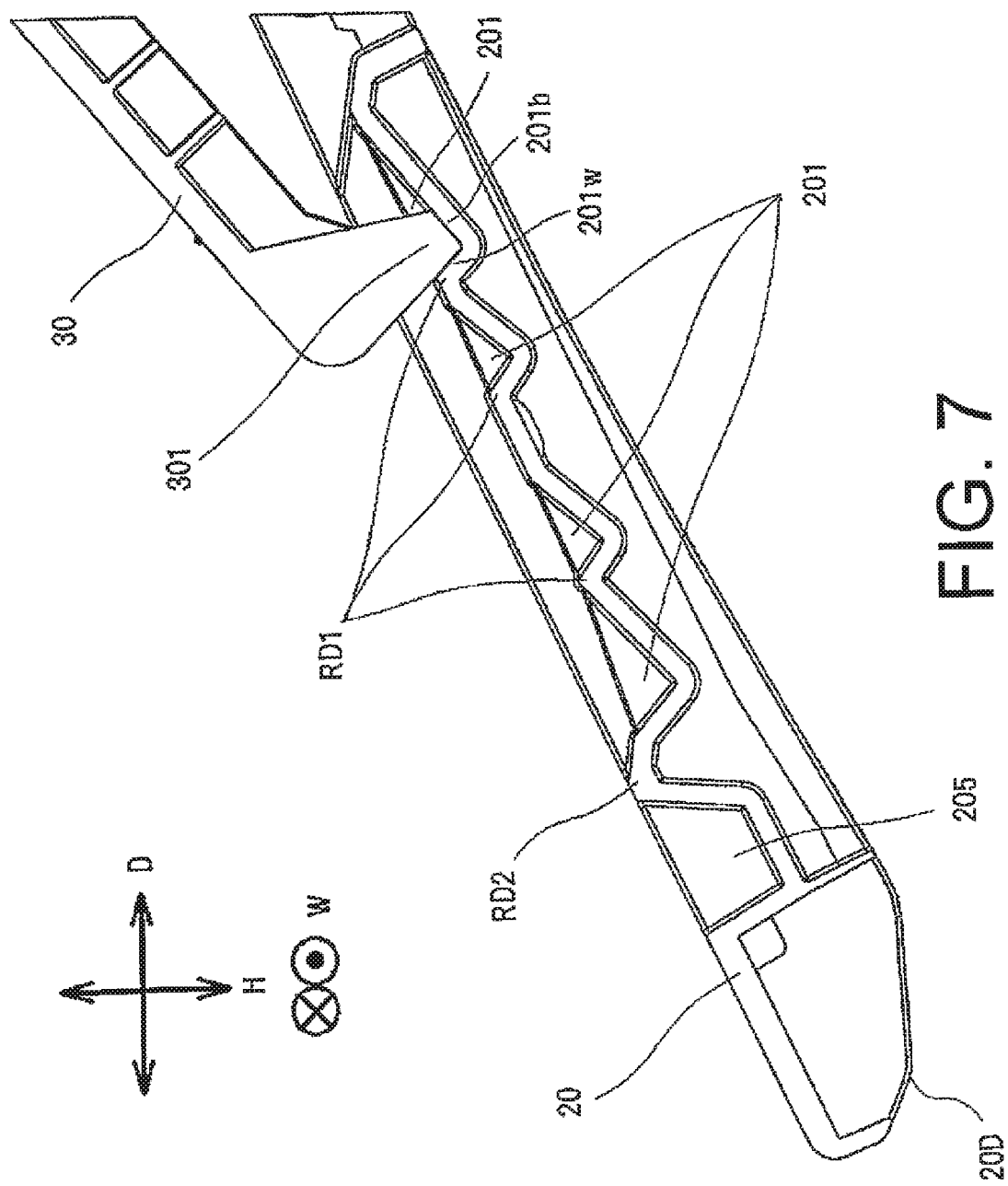
FIG. 7 is a sectional view for illustrating main components of the support leg portion and the brace portion taken along the line 7-7 of FIG. 1.

With reference also to FIG. 7, the plurality of receiving seats 201 intersect a pivoting direction of the support leg portions 20, and are formed in an upper surface 20u of each of the two support leg portions that are opposed to the paired brace portions 30. The plurality of receiving seats 201 each have a recessed shape capable of receiving the anchor portion 301 of each of the paired brace portions 30, and are arrayed in a longitudinal direction. In this embodiment, the number of the receiving seats 201 of each of the two support leg portions is four. As illustrated in FIG. 7, each of the receiving seats 201 includes a bottom surface 201b and a wall surface 201w. Meanwhile, the anchor portion 301 of each of the two brace portions of the paired brace portions 30 has a sectional shape conforming to the bottom surface 201b and the wall surface 201w of the receiving seat 201. Further, an edge portion RD1 is formed in each of the receiving seats 201. An intermediate plate 209 is provided across the four receiving seats.

The plurality of bowl-shaped hole portions 202 are formed in each of inner side surfaces 20s of the two support leg portions of the paired support leg portions 20. The inner side surfaces 20s are parallel to the pivoting direction of the paired support leg portions 20 and are opposed to each other. The plurality of bowl-shaped hole portions 202 are arrayed in the longitudinal direction so as to correspond to the four receiving seats 201, respectively.

With reference to FIG. 4, FIG. 5, FIG. 6, and FIG. 8, the two brace portions of the paired brace portions 30 each include a biasing stud 302.

Figure 5:
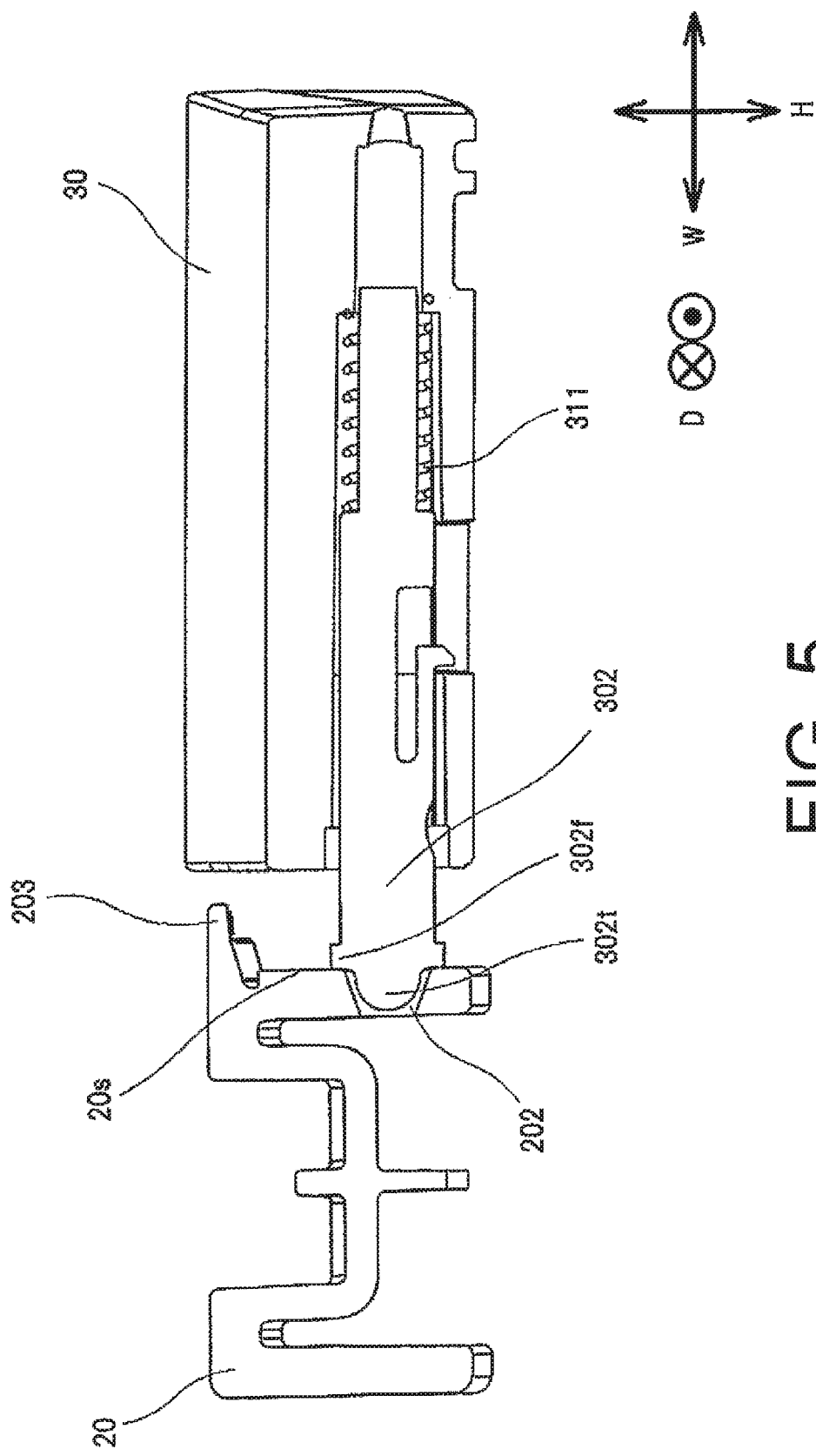
FIG. 5 is a sectional view for illustrating the support leg portion and the brace portion in the first embodiment and the second embodiment of this invention.

The biasing stud 302 is formed on an outer side surface 30s opposed to the inner side surface 20s of each of the support leg portions of the paired support leg portions 20 and located nearer to the distal end 30D than to the proximal end 30P. The biasing stud 302 projects toward an outer side in the width direction W of the mount portion 10 under a state of being biased by a coil spring 311, and includes a hemispherical tip 302t and a flange portion 302f formed at a proximal end portion of the hemispherical tip 302t. When the anchor portion 301 is received in any one of the plurality of receiving seats 201 of each of the support leg portions of the paired support leg portions 20, as illustrated in FIG. 5, the biasing stud 302 enters the bowl-shaped hole portion 202 corresponding to the receiving seat 201 in which the anchor portion 301 is received.

The two brace portions of the paired brace portions 30 are configured to keep an inclination angle of the electronic equipment mounted on the mount portion 10 with the following features. Specifically, the two brace portions of the paired brace portions 30 are configured to keep an opening angle of the paired support leg portions 20 with respect to the mount portion 10 when the anchor portion 301 is received in any one of the plurality of receiving seats 201 of each of the two support leg portions of the paired support leg portions 20 and the biasing stud 302 enters the bowl-shaped hole portion corresponding to the receiving seat in which the anchor portion 301 is received.

Moreover, the two brace portions of the paired brace portions 30 are configured to be capable of changing the inclination angle of the electronic equipment 600 mounted on the mount portion 10 with the following features. Specifically, the anchor portion 301 having been received in any one of the plurality of receiving seats 201 of each of the paired support leg portions 20 is disengaged from the receiving seat 201 along with an operation of causing the paired brace portions 30 to pivot by a user, and the biasing stud 302 having entered the bowl-shaped hole portion 202 is removed from the bowl-shaped hole portion 202 as illustrated in FIG. 6 and thus slides on the inner side surface 20s of each of the support leg portions of the paired support leg portions 20.

Figure 3:
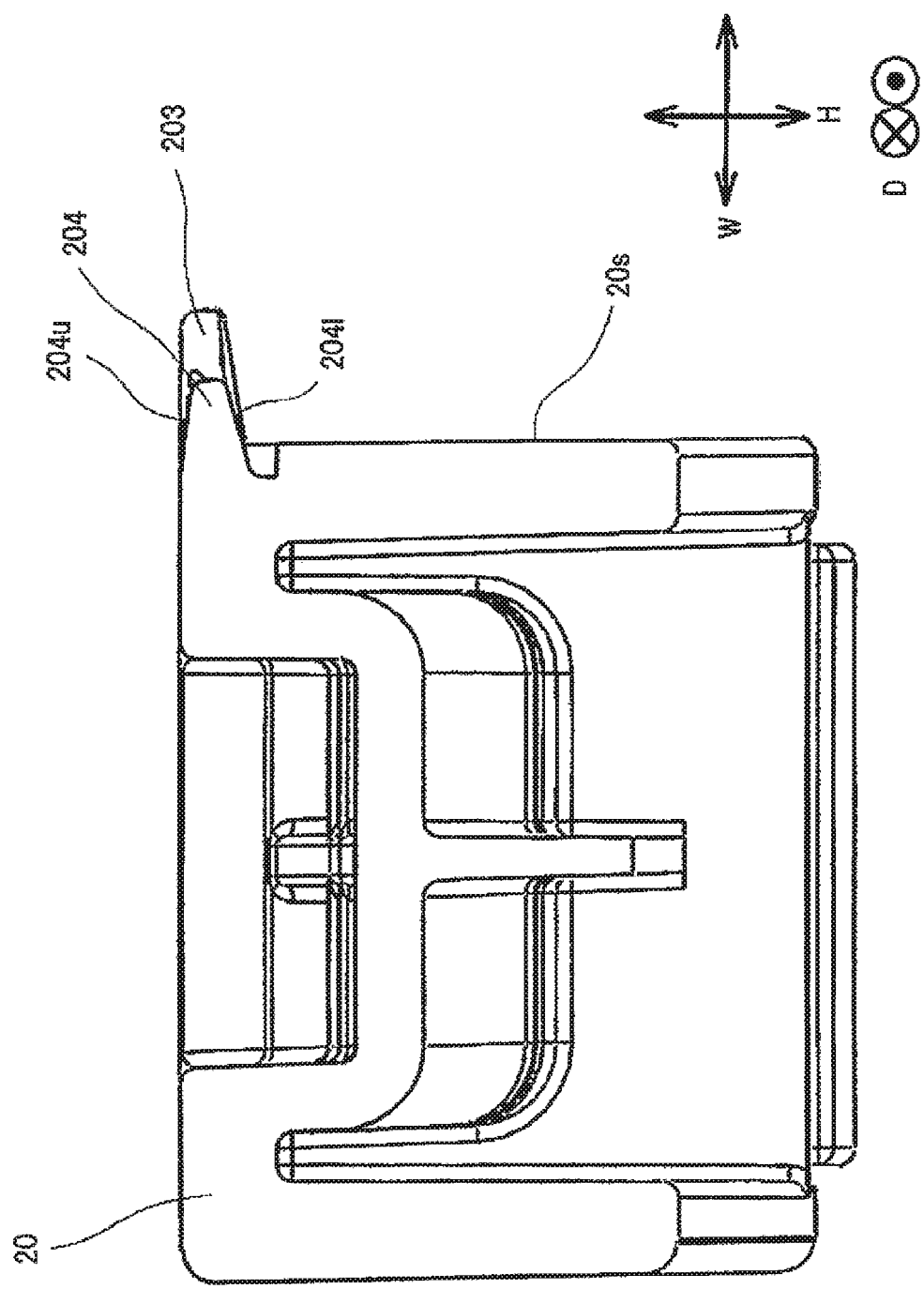
FIG. 3 is a sectional view for illustrating the support leg portions taken along the line 3-3 of FIG. 2.
Figure 8:
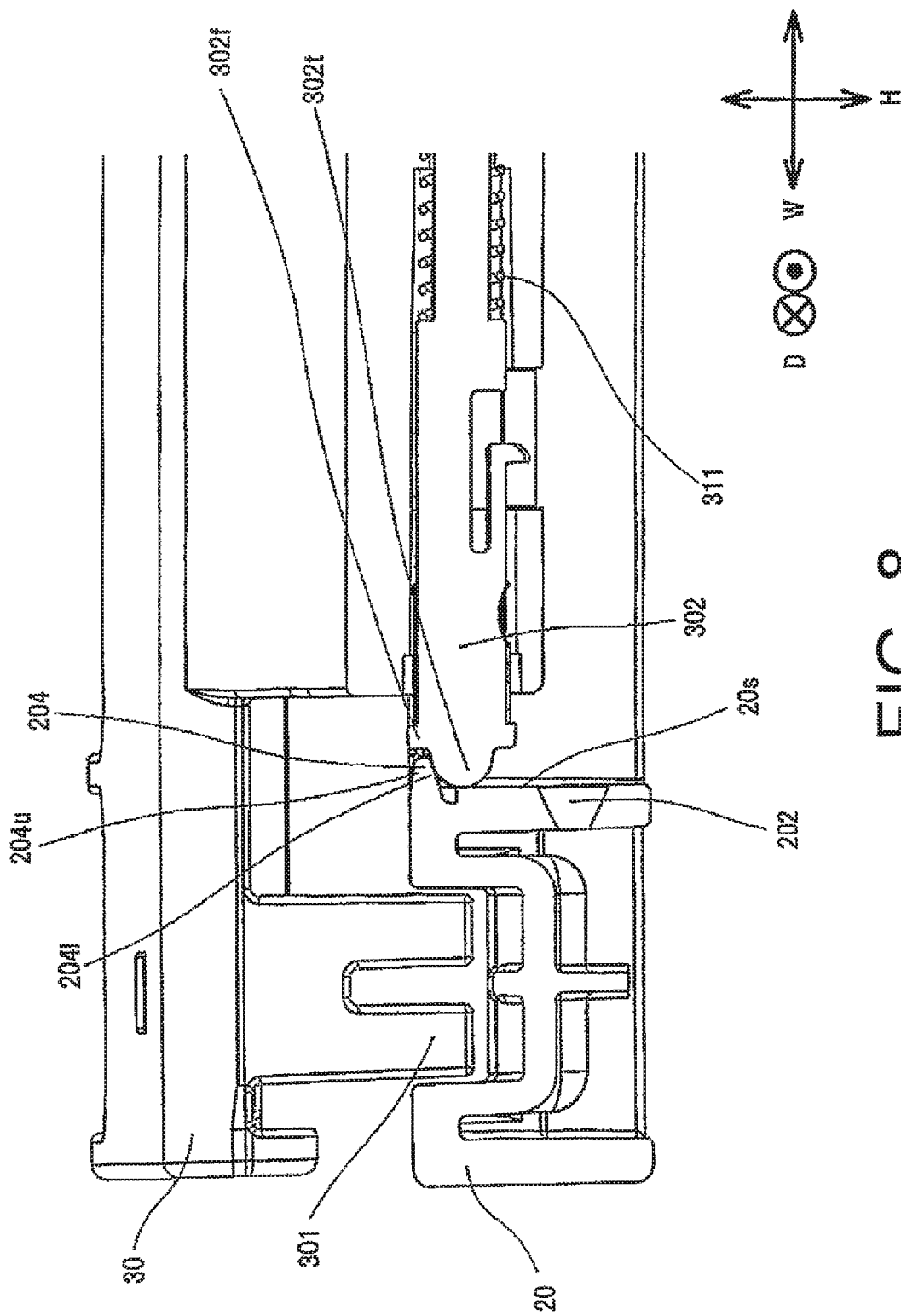
FIG. 8 is a sectional view for illustrating main components of the support leg portion and the brace portion in the first embodiment and the second embodiment of this invention.

With reference also to FIG. 2 and FIG. 3, as illustrated in FIG. 2, each of the two support leg portions of the paired support leg portions 20 further includes a rib 203 that projects from an edge of the inner side surface 20s adjacent to the upper surface 20u toward an inner side in the width direction W of the mount portion 10, and extends in the longitudinal direction. Further, the rib 203 includes a cutout portion (cutout rib) 204 formed nearer to the proximal end 20P of each of the support leg portions of the paired support leg portions 20 than to the distal end 20D. As illustrated in FIG. 8, the cutout rib 204 includes a lower tapered surface 204*l* and an upper tapered surface 204*u*.

Figure 6:
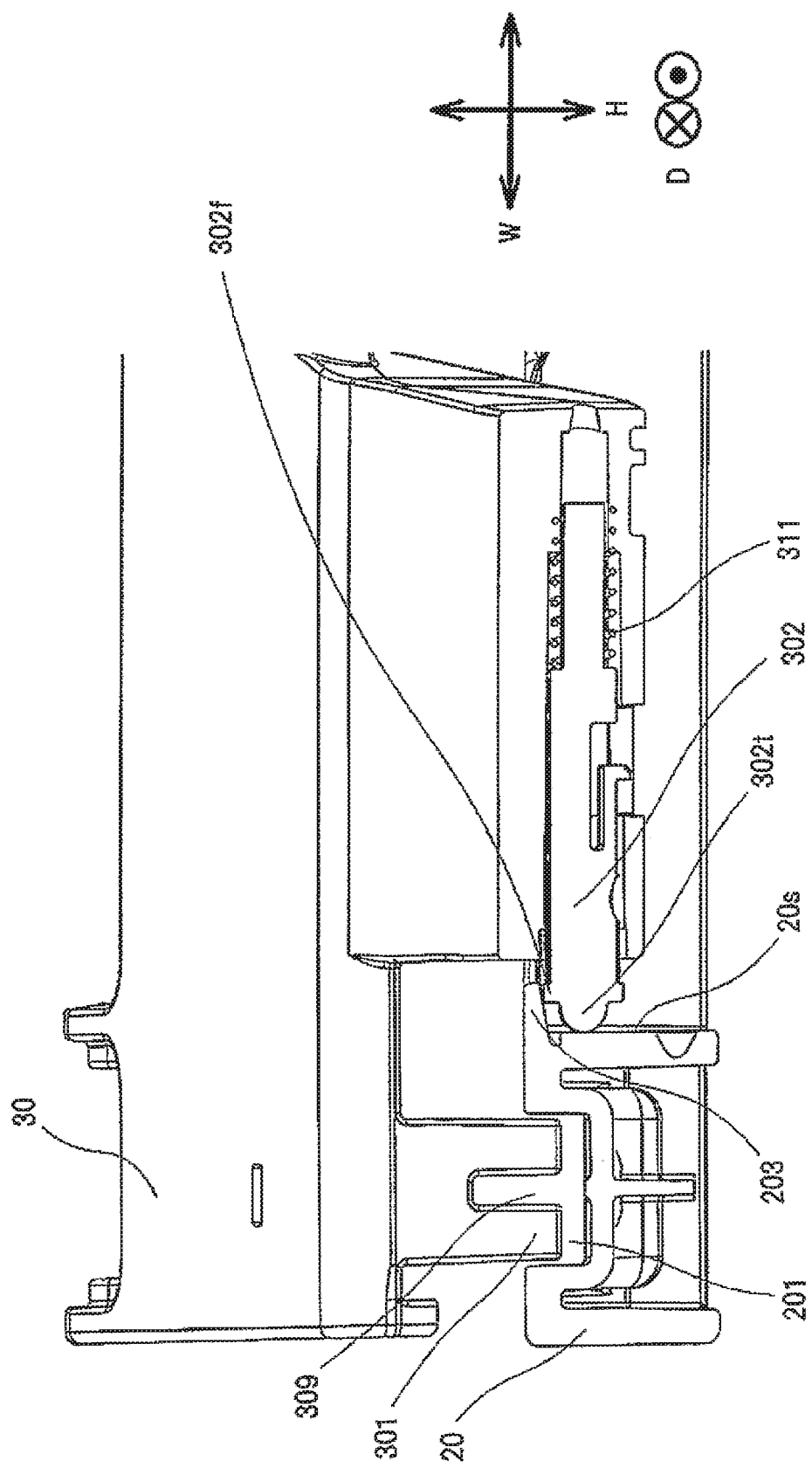
FIG. 6 is a sectional view for illustrating main components of the support leg portion and the brace portion in the first embodiment and the second embodiment of this invention.

As illustrated in FIG. 6, the rib 203 is configured to prevent the biasing stud 302 of each of the brace portions of the paired brace portions 30 from slipping off the inner side surface 20s while sliding on the inner side surface 20s of each of the support leg portions of the paired support leg portions 20.

Further, the cutout rib 204 is configured to allow the biasing stud 302 of each of the brace portions of the paired brace portions 30 to arrive on the inner side surface 20s through the upper tapered surface 204*u* of the cutout rib 204, and allow the biasing stud 302 to be disengaged from the inner side surface 20s through the lower tapered surface 204*l* of the cutout rib 204.

Figure 9:
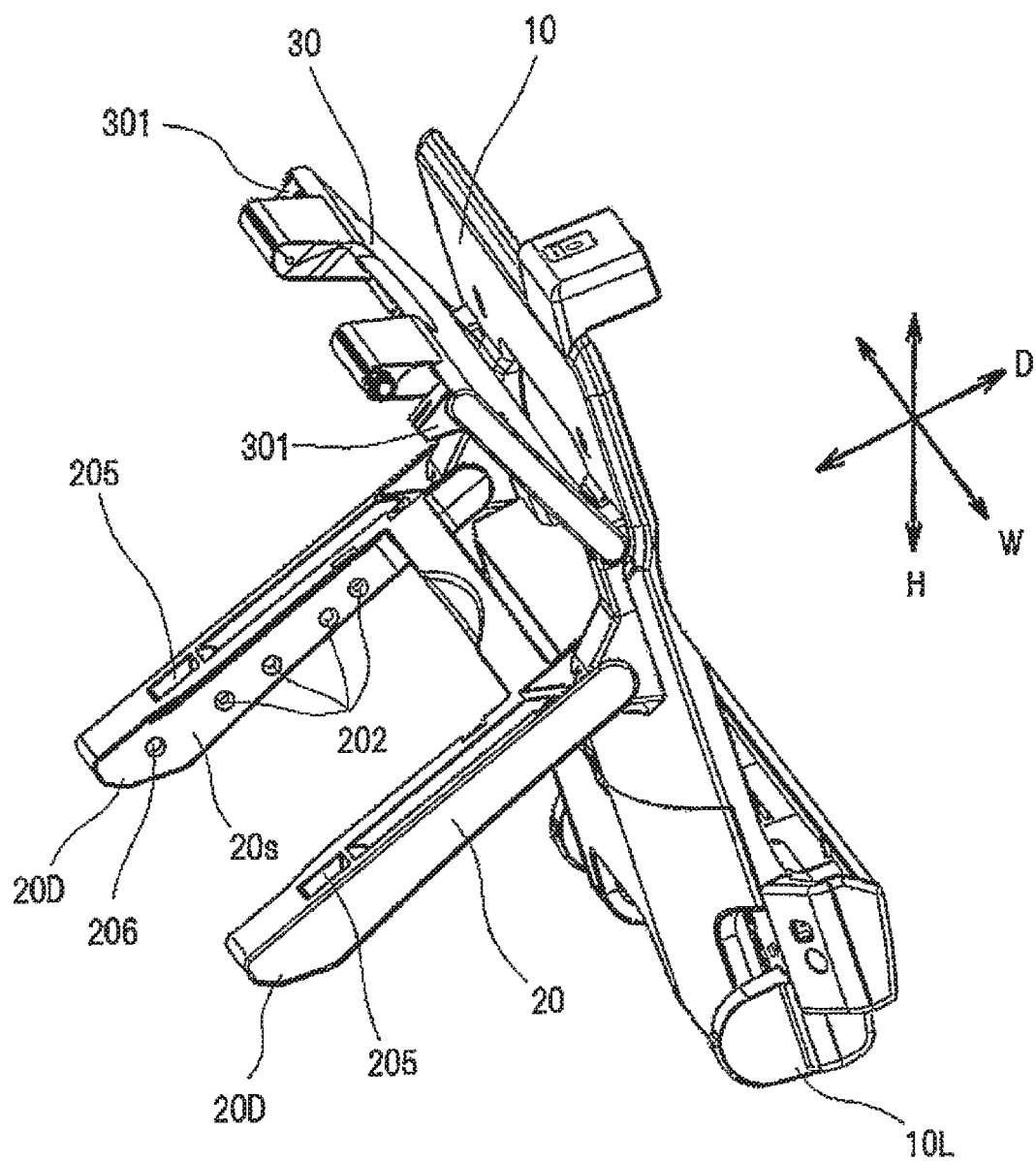
FIG. 9 is a perspective view for illustrating the support device for electronic equipment according to the first embodiment of this invention when the brace portions are separated from the support leg portions.
Figure 10:
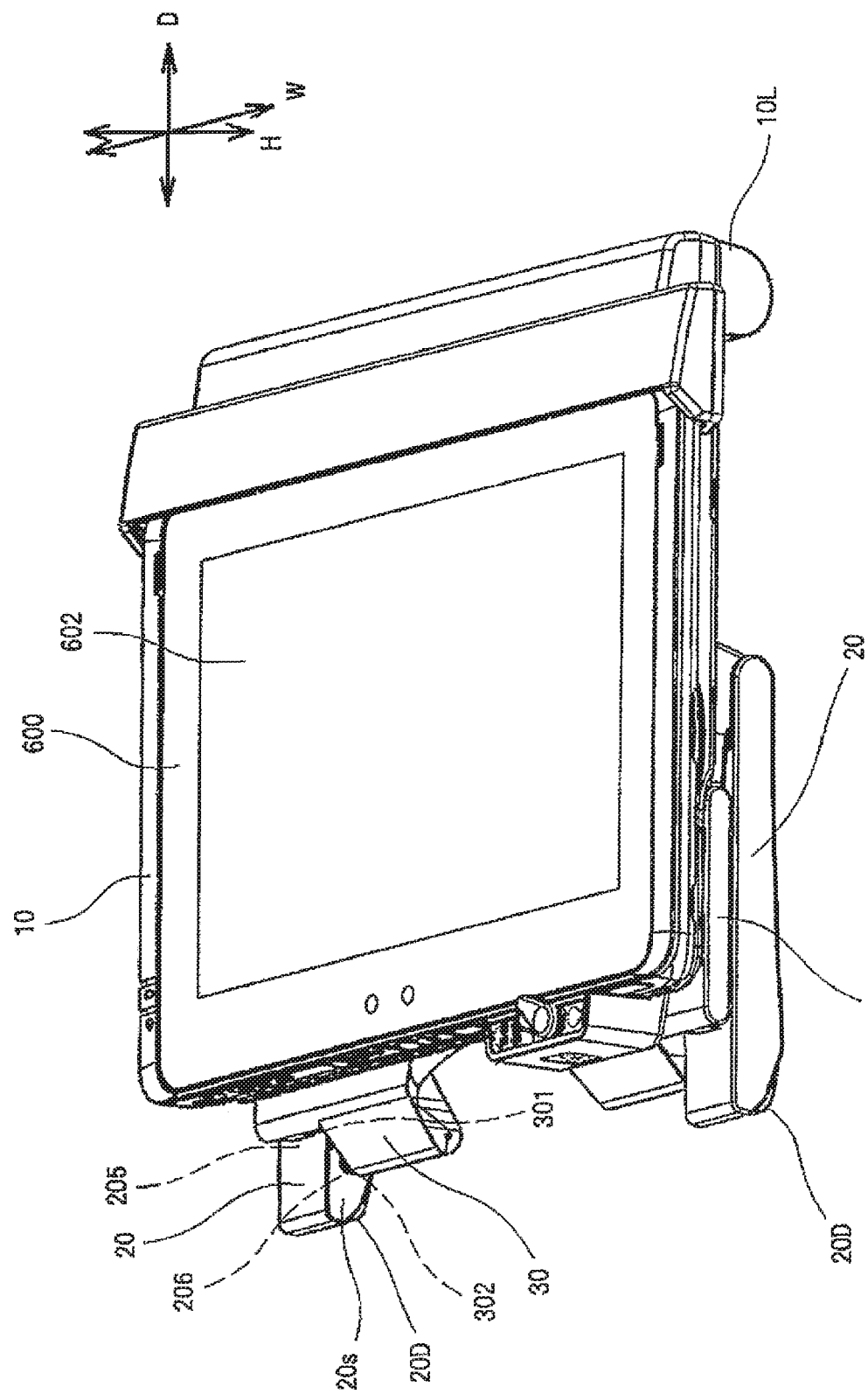
FIG. 10 is a perspective view for illustrating the support device for electronic equipment according to the first embodiment of this invention when electronic equipment is mounted and the support leg portions and the brace portions are folded.
Figure 13:
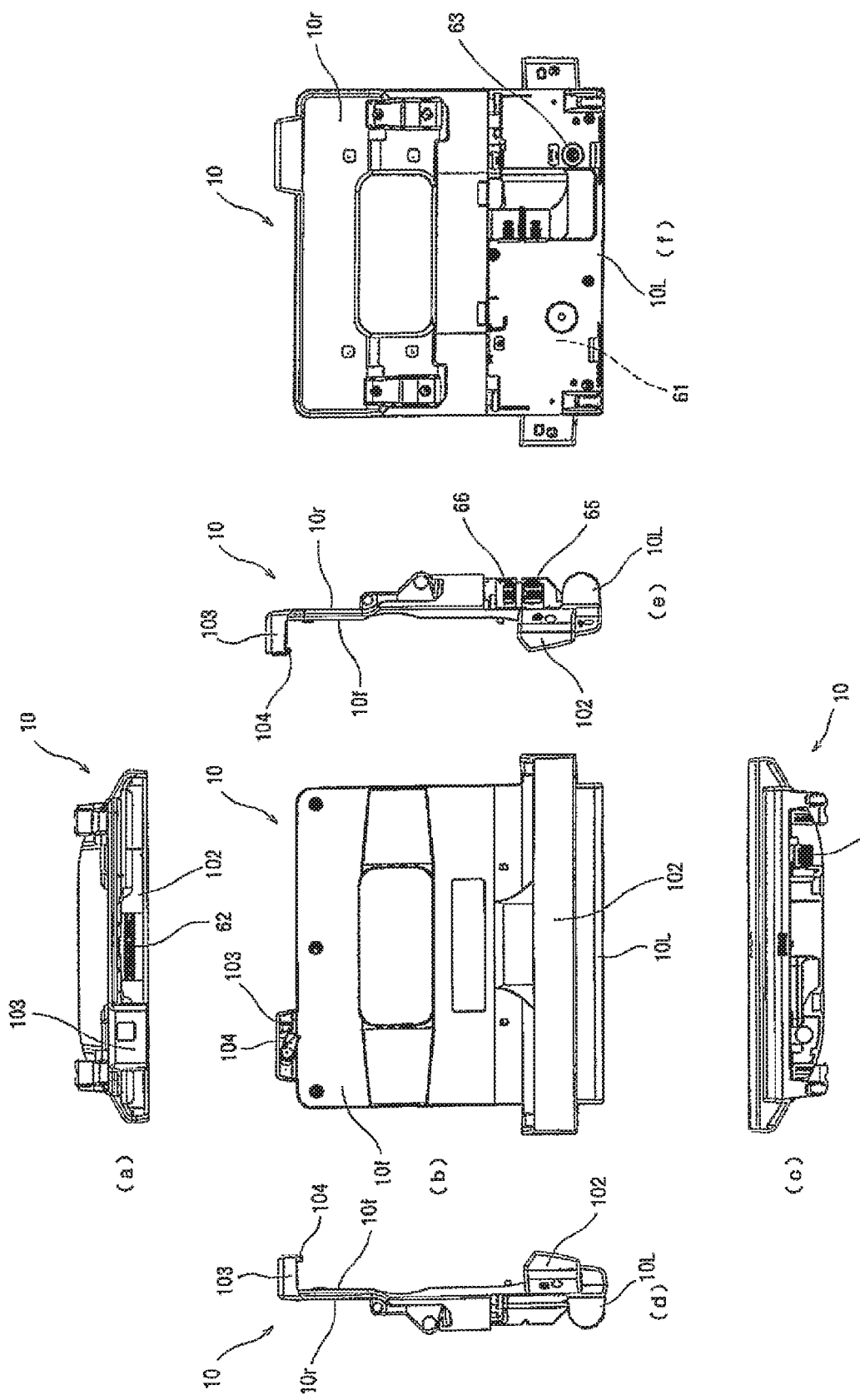
FIG. 13 includes views for illustrating the mount portion in the first embodiment of this invention, (a), (b), (c), (d), (e), and (f) being a top view, a front view, a bottom view, a left side view, a right side view, and a back view, respectively.
Figure 14:
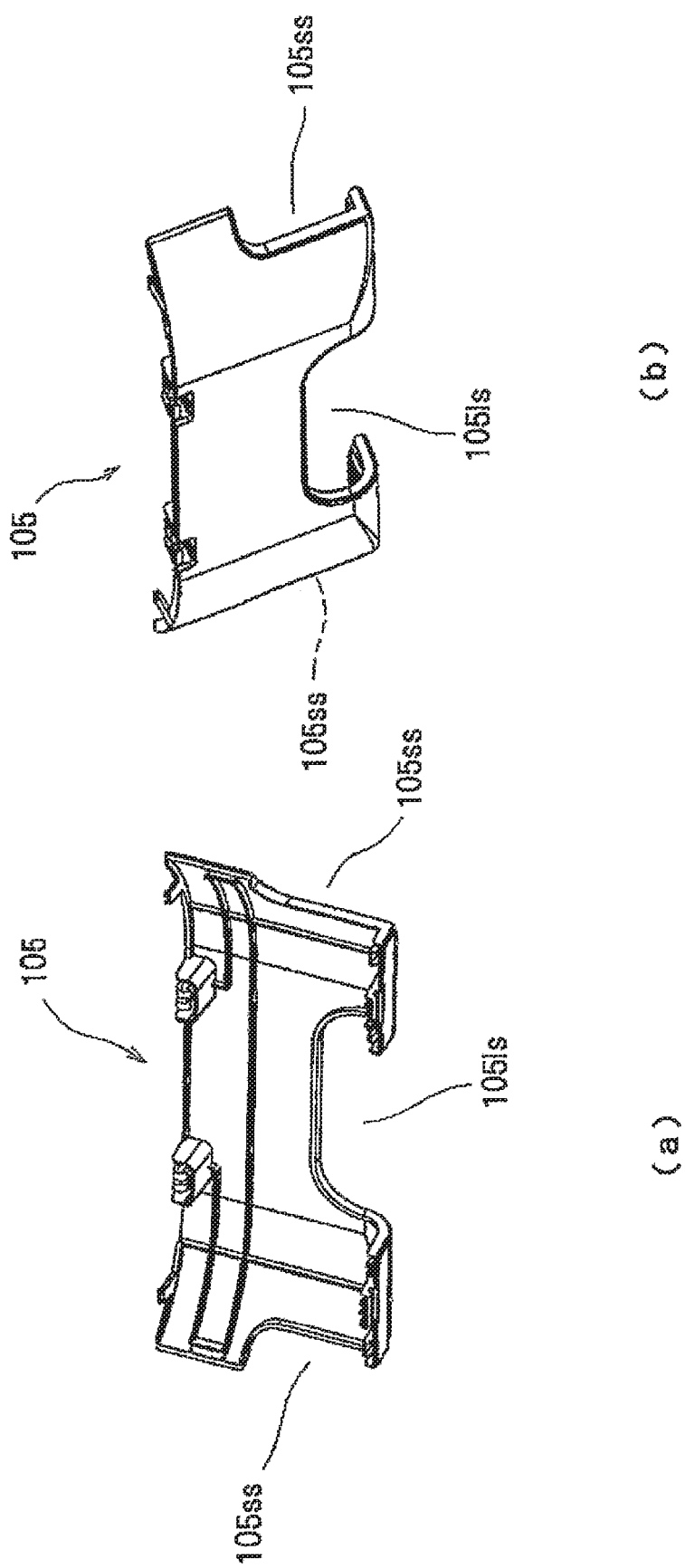
FIG. 14 are views for illustrating the rear cover in the first embodiment of this invention, (a) being a perspective view when seen from an inner side thereof, (b) being a perspective view when seen from an outer side thereof.
Figure 15:
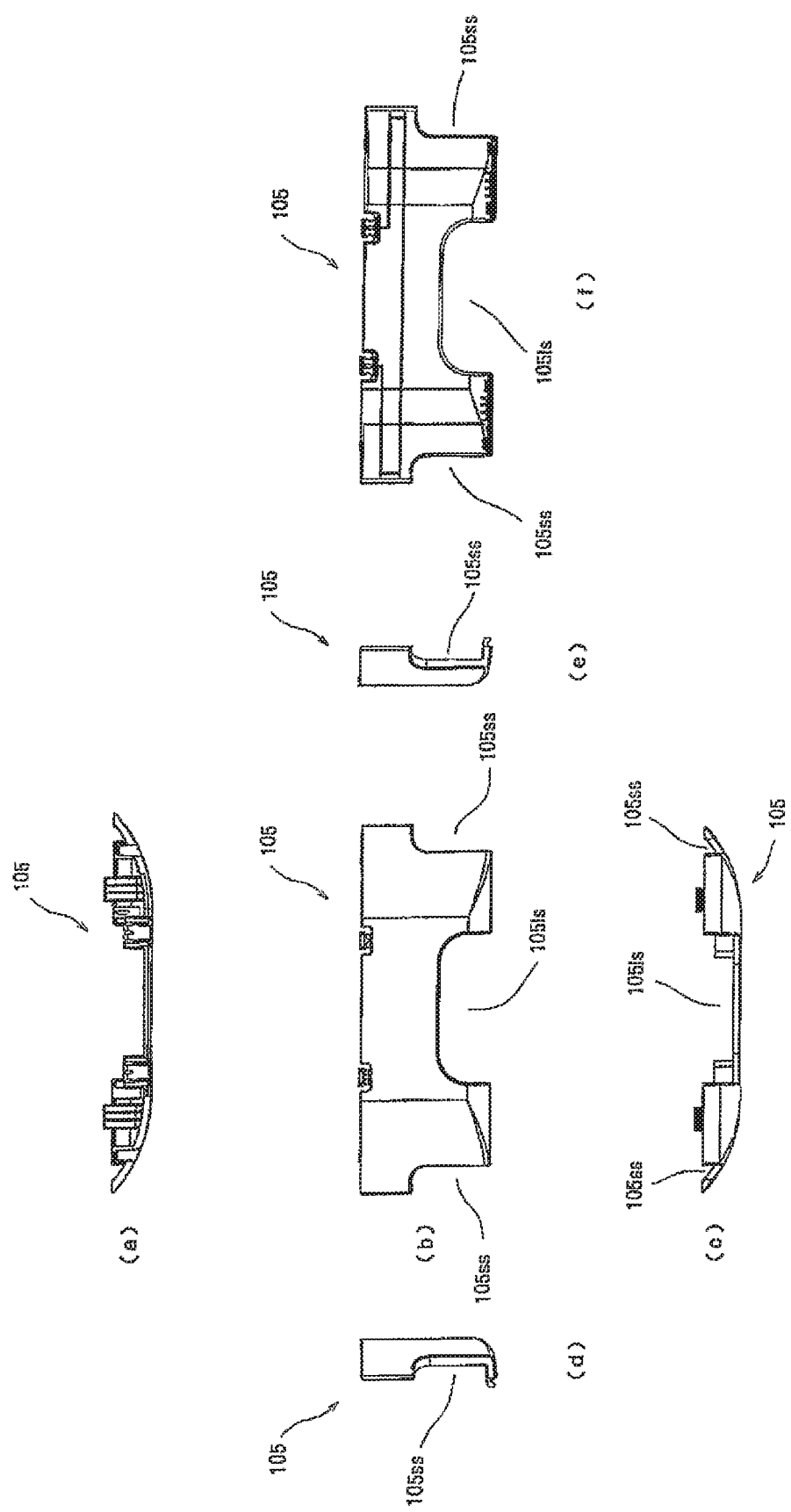
FIG. 15 includes views for illustrating the rear cover in the first embodiment of this invention, (a). (b), (c), (d), (e), and (f) being a top view, a front view, a bottom view, a left side view, a right side view, and a back view, respectively.
Figure 16:
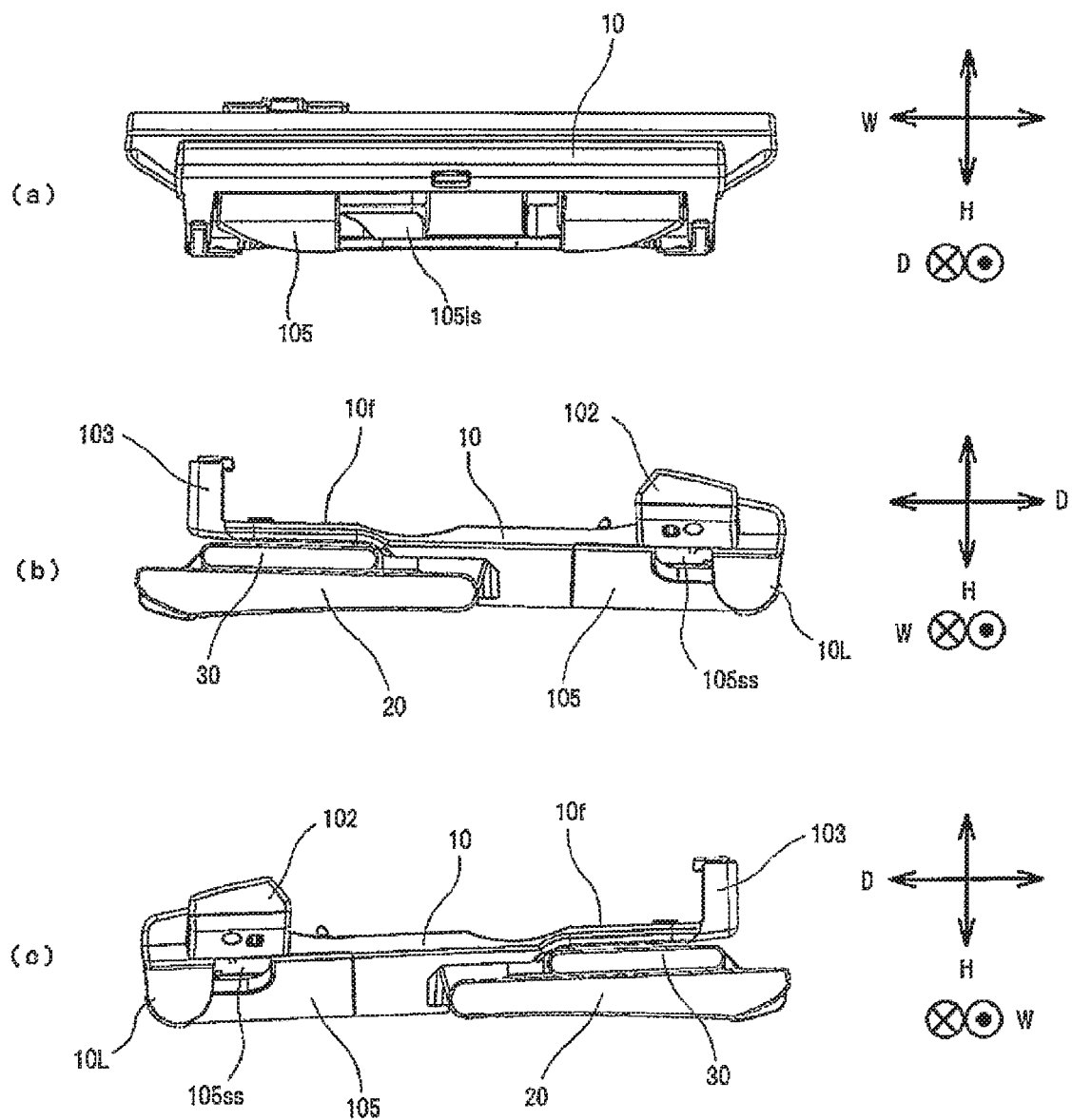
FIG. 16 includes views for illustrating the support device for electronic equipment according to the first embodiment of this invention when the support leg portions and the brace portions are folded, (a), (b), and (c) being a front view, a left side view, and a right side view, respectively.

Moreover, the support device according to this invention is configured as described below. Specifically, after the paired brace portions 30 are disengaged from the paired support leg portions 20 as illustrated in FIG. 9, when the paired support leg portions 20 and the paired brace portions 30 are folded so as to be parallel to the rear surface of the mount portion 10 as illustrated in FIG. 10 and FIG. 16, the support device can place the electronic equipment 600 (FIG. 10) mounted on the mount portion 10 so that the electronic equipment 600 is laid on a table (not shown). Similarly, the support device enables the electronic equipment to be mounted on the mount portion 10 under a state in which the mount portion 10 is hung on a wall (not shown).

Regarding the folding structure of the paired support leg portions 20 and the paired brace portions 30, as illustrated in FIG. 2, each of the two support leg portions of the paired support leg portions 20 further includes an anchor accommodation portion 205 and a folding bowl-shaped hole portion 206. As illustrated in FIG. 7, a partition portion RD2 is formed between the anchor accommodation portion 205 and the receiving seat 201 adjacent thereto at a position higher than that of the edge portion RD1.

The anchor accommodation portion 205 is formed in the upper surface 20u of each of the two support leg portions of the paired support leg portions 20. The anchor accommodation portion 205 has a recessed shape capable of accommodating the anchor portion 301 of each of the brace portions of the paired brace portions 30 that are folded so as to be parallel to the rear surface of the mount portion 10 when the paired support leg portions 20 are folded so as to be parallel to the rear surface 10r (FIG. 1) of the mount portion 10 as illustrated in FIG. 10 and FIG. 16.

The folding bowl-shaped hole portion 206 is formed in the inner side surface 20s of each of the two support leg portions of the paired support leg portions 20, and is formed so as to correspond to the anchor accommodation portion 205.

The two brace portions of the paired brace portions 30 are configured to keep the opening angle of the paired support leg portions 20 with respect to the rear surface 10r of the mount portion 10 so that the paired support leg portions 20 are parallel to the rear surface 10r of the mount portion 10 in such a manner that, when the paired brace portions 30 are folded so as to be parallel to the rear surface 10r of the mount portion 10, the anchor portion 301 is accommodated in the anchor accommodation portion 205 of each of the paired support leg portions 20, and the biasing stud 302 enters the folding bowl-shaped hole portion 206. In this manner, once the paired support leg portions 20 and the paired brace portions 30 are folded so as to be parallel to the rear surface 10r of the mount portion 10, even when the support device according to this invention is lifted up from the table, the parallelly folded state is maintained.

With reference also to FIG. 11 to FIG. 15, the mount portion 10 includes an equipment accommodation portion 102, a mounted item retaining portion 103, a retaining claw 104, and a rear cover 105. The equipment accommodation portion 102 is configured to accommodate a lower end portion of the electronic equipment 600. The mounted item retaining portion 103 is configured to releasably retain an upper end portion of the electronic equipment 600 accommodated in the equipment accommodation portion 102. The retaining claw 104 is openable and closable. The rear cover 105 is removably mounted to the rear surface 10r. Further, the mount portion 10 includes a front surface 10f, support leg pivot shaft holes 112, and brace pivot shaft holes 113. The front surface 10f is to be held in abutment against the mounted electronic equipment. The support leg pivot shaft holes 112 accommodate the support leg pivot shafts 210. The brace pivot shaft holes 113 accommodate the brace pivot shafts 310.

Moreover, the mount portion 10 includes contact pins 62 of a probe type, a charging circuit 61, and connectors 63, 64, 65, and 66. The contact pins 62 are to be connected to a connector (not shown), which is to be used for charging and signal input and output and is provided at the lower end portion of the electronic equipment 600. The connector 63 is to be connected to a cable connector of an alternating current (AC) adapter (not shown). The connectors 64, 65, and 66 are to be used for signal input and output. The charging circuit 61 is built in the mount portion 10.

The rear cover 105 includes lead-out cutout portions 105ss formed on both sides thereof, and a lead-out cutout portion 1051s formed on a lower side thereof. The lead-out cutout portions 105ss and the lead-out cutout portion 1051s are configured to lead out cable connectors (not shown) which are to be connected to the connectors 63 to 66, respectively.

The lead-out cutout portions 105ss and 1051s are formed to have such a position, a shape, and a size as to be prevented from being closed by a table surface, the paired support leg portions 20, and the paired brace portions 30 when the electronic equipment 600 mounted on the mount portion 10 is supported on the table under a state of being inclined rearward as illustrated in FIG. 1, and when the electronic equipment mounted on the mount portion 10 is placed in a laid state on the table as illustrated in FIG. 10 and FIG. 16. When the mount portion 10 is hung on the wall (not shown) and the electronic equipment is mounted on the mount portion 10, similarly, the lead-out cutout portions 105ss and 1051s are prevented from being closed.

Next, description is made of movement of components of the support device according to this invention when the support device is operated.

FIG. 6 is a sectional view for illustrating the biasing stud 302 and the support leg portion of one of the paired support leg portions 20 in an angle changeable state. Further, FIG. 7 is a sectional view for illustrating an angle fixed state taken along the line 7-7 of FIG. 1.

In the angle changeable state, when the paired brace portions 30 pivot, the flange portion 302f of the biasing stud 302 moves while sliding along a lower surface of the rib 203 of each of the support leg portions of the paired support leg portions 20. Accordingly, the angle between the mount portion 10 and the paired support leg portions 20 can be changed while the paired support leg portions 20 and the paired brace portions 30 interlock with each other without separating from each other. When the paired brace portions 30 are moved in the angle changeable state, it is required that the anchor portion 301 of each of the brace portions of the paired brace portions 30 have a projection amount that establishes a positional relationship of not interfering with the edge portions RD1 of the receiving seats 201 of each of the support leg portions of the paired support leg portions 20, and establishes a positional relationship of interfering with the partition portion RD2. Through interference between the partition portion RD2 and the anchor portion 301, the biasing stud 302 is restrained from sliding into a folded state (FIG. 10).

The angle changeable state is shifted to the angle fixed state when the anchor portion 301 of each of the brace portions of the paired brace portions 30 is fitted to any one of the receiving seats 201 of each of the support leg portions of the paired support leg portions 20. In this manner, a predetermined angle is determined, and the predetermined angle is maintained while the anchor portion 301 and the bottom surface 201b and the wall surface 201w of the receiving seats 201 bear gravity and a force applied to the table (placement surface) from above. Further, as illustrated in FIG. 5, the positional relationship in the angle fixed state between the biasing stud 302 and each of the support leg portions of the paired support leg portions 20 corresponds to a state in which the hemispherical tip 302t of the biasing stud 302 is inserted in the bowl-shaped hole portion 202. Owing to the positional relationship between the biasing stud 302 and the bowl-shaped hole portion 202, at the time of application of a force of separating the paired support leg portions 20 from the paired brace portions 30, which is generated, for example, when the support device according to this invention is lifted up, a bowl-shaped surface of the bowl-shaped hole portion 202 and the hemispherical tip 302t of the biasing stud 302 interfere with each other. Thus, the angle fixed state is not easily shifted to the angle changeable state, and the angle fixed state is maintained.

The angle fixed state illustrated in FIG. 5 is shifted to the angle changeable state in the following manner. When the paired brace portions 30 pivot in a direction of separating from the paired support leg portions 20 (direction of approaching the rear surface 10r of the mount portion 10), the hemispherical tip 302t is pushed in a direction of a center axis of the biasing stud 302 by the tapered bowl-shaped surface of the bowl-shaped hole portion 202. When a predetermined force equivalent to or larger than a spring force of the coil spring 311 is applied, the hemispherical tip 302t is disengaged from the bowl-shaped hole portion 202 to slide on the inner side surface 20s, and the flange portion 302f is moved to come into contact with the rib 203. In this manner, the angle fixed state is shifted to the angle changeable state. At this time, the anchor portion 301 of each of the brace portions of the paired brace portions 30 is also disengaged from the receiving seat 201 of each of the support leg portions of the paired support leg portions 20.

Next, description is made of an operation of disconnecting the paired support leg portions 20 and the paired brace portions 30 from each other.

FIG. 8 is a sectional view for illustrating the biasing stud 302 and the support leg portion of one of the paired support leg portions 20 when the biasing stud 302 is arranged below the cutout rib 204. Further, FIG. 9 is a view for illustrating a state in which the paired support leg portions 20 and the paired brace portions 30 are disconnected from each other.

The cutout rib 204 has such a cutout dimension that an end portion thereof is brought into contact with the hemispherical tip 302t of the biasing stud 302. The lower tapered surface 204l of the cutout rib 204 has a predetermined angle with respect to the center axis of the biasing stud 302. Accordingly, when the lower tapered surface 204l is held in contact with the hemispherical tip 302t, the paired support leg portions 20 and the paired brace portions 30 pivot in the separating direction so that the hemispherical tip 302t is pushed in the direction of the center axis of the biasing stud 302 along an angle of the lower tapered surface 204l. When the predetermined force equivalent to or larger than the spring force of the coil spring 311 is applied, the hemispherical tip 302t climbs over the end portion of the cutout rib 204. In this manner, as illustrated in FIG. 9, the paired support leg portions 20 and the paired brace portions 30 are separated from each other.

Further, in order to perform such separating operation, it is required that the predetermined force equivalent to or larger than the spring force of the coil spring 311 be applied in the direction of separating the paired support leg portions 20 and the paired brace portions 30 from each other. Thus, resistance is given when the biasing stud 302 slides on and passes over the cutout rib 204 under the angle changeable state, and hence the biasing stud 302 does not easily climb over the cutout rib 204. Accordingly, the paired support leg portions 20 and the paired brace portions 30 are prevented from being unintentionally disconnected from each other.

Next, description is made of an operation of folding the support device according to the embodiment of this invention.

FIG. 10 is a view for illustrating a folded state of the support device according to the embodiment of this invention.

From the state in which the paired support leg portions 20 and the paired brace portions 30 are disconnected from each other as illustrated in FIG. 9, the paired support leg portions 20 and the paired brace portions 30 pivot independently of each other, and the anchor portions 301 of the brace portions of the paired brace portions 30 are fitted into the anchor accommodation portions 205 of the support leg portions of the paired support leg portions 20. In this manner, the support device can be folded. At this time, the anchor portions 301 of the brace portions of the folded paired brace portions 30 are accommodated in the anchor accommodation portions 205 of the support leg portions of the paired support leg portions 20.

According to the first embodiment of this invention, when the paired brace portions are caused to pivot in the direction of approaching the rear surface of the mount portion, the support device is brought into a disengaged state (angle changeable state) in which the receiving seats and the anchor portions are disengaged from each other and the bowl-shaped hole portions and the biasing studs are disengaged from each other. As a result, the inclination angle can be changed. That is, it is not required that the support device and the electronic equipment be held by hand, and it is possible to obtain an effect of being capable of bringing the support device into the disengaged state (angle changeable state), in which the inclination angle can be changed, by only causing the paired brace portions to pivot in the direction of approaching the rear surface of the mount portion.

Further, unintentional folding is not performed while changing the inclination angle, and hence it is possible to also obtain such an effect that there is no risk of trapping a user's finger or the like.

Moreover, irrespective of whether the support leg portions are in a standing state or a folded state, cables can be led out of the plurality of lead-out cutout portions in respective directions without any trouble.

Second Embodiment

A support device according to a second embodiment of this invention is different from the support device according to the first embodiment in that the support device is not provided separately from electronic equipment, but the electronic equipment itself has a support function. However, the support device according to the second embodiment includes the same components of the invention as those of the first embodiment except that the mount portion is not provided. Accordingly, the description and the drawings in the first embodiment are used for the configuration that is the same or similar to that of the first embodiment, and detailed description thereof is omitted below.

With reference to FIG. 17, electronic equipment 700 according to a second embodiment of this invention includes a display 702 with a touch panel, a casing 710, paired support leg portions 20, and paired brace portions 30.

The paired support leg portions 20 include two support leg portions. The support leg portions are paired with each other in a width direction W of the casing 710, and each have a bar-like shape extending from a proximal end 20P to a distal end 20D. The proximal end 20P is mounted to a rear surface 710r of the casing 710 so as to be pivotable about a pivot axis extending along the width direction W of the casing 710, and the support leg portions are connected to each other in vicinities of the proximal ends 20P. The two support leg portions of the paired support leg portions 20 may be connected to each other in a region between the proximal ends 20P and the distal ends 20D other than the vicinities of the proximal ends 20P.

The paired brace portions 30 include two brace portions. The brace portions are paired with each other in the width direction W of the casing 710, and each have a bar-like shape extending from a proximal end 30P to a distal end 30D. The proximal end is mounted to the rear surface 710r of the casing 710 so as to be pivotable about a pivot axis extending along the width direction W of the casing 710, and the brace portions are connected to each other at portions other than the distal ends 30D. The two brace portions of the paired brace portions 30 may be connected to each other at the distal ends 30D. Alternatively, the two brace portions of the paired brace portions 30 may be connected to each other in a region between the proximal ends 30P and the distal ends 30D.

The support device is configured to support, by a lower end 710L of the casing 710 and the distal ends 20D of the paired support leg portions 20, the electronic equipment 710 mounted on the casing 710 under a state in which the electronic equipment 700 is inclined rearward in a depth direction D.

The structure of the paired support leg portions 20 and the paired brace portions 30 corresponds to the structure obtained by replacing the mount portion 10 by the casing 710 of the electronic equipment 700) in the description of the first embodiment with reference to FIG. 2 to FIG. 16.

According to the second embodiment of this invention, when the paired brace portions are caused to pivot in a direction of approaching the rear surface of the casing of the electronic equipment, the electronic equipment is brought into a disengaged state (angle changeable state) in which the receiving seats and the anchor portions are disengaged from each other and the bowl-shaped hole portions and the biasing studs are disengaged from each other. As a result, the inclination angle can be changed. That is, it is not required that the electronic equipment be held by hand, and it is possible to obtain an effect of being capable of bringing the electronic equipment into the disengaged state (angle changeable state), in which the inclination angle can be changed, by only causing the paired brace portions to pivot in the direction of approaching the rear surface of the casing of the electronic equipment.

Further, unintentional folding is not performed while changing the inclination angle, and hence it is possible to also obtain such an effect that there is no risk of trapping a users finger or the like.

REFERENCE SIGNS LIST 10 mount portion
10r rear surface
10L lower end
105 rear cover
105ss, 1051s lead-out cutout portion
112 support leg pivot shaft hole
113 brace pivot shaft hole
20 paired support leg portions
20P proximal end
20D distal end
20s inner side surface
20u upper surface
201 receiving seat
201b bottom surface
201w wall surface
202 bowl-shaped hole portion
203 rib
204 cutout portion
204l lower tapered surface
204u upper tapered surface
205 anchor accommodation portion
206 folding bowl-shaped hole portion
209 intermediate plate
210 support leg pivot shaft 30 paired brace portions
30P proximal end
30D distal end
301 anchor portion
30s outer side surface
302 biasing stud
302t hemispherical tip
302f flange portion
309 recessed portion
310 brace pivot shaft
311 coil spring
600, 700 electronic equipment
602, 702 display with touch panel
710 casing
710L lower end
710r rear surface
RD1 edge portion
RD2 partition portion

The invention claimed is:

1. A support device for electronic equipment, comprising:
a mount portion configured to allow electronic equipment to be removably mounted thereon;
paired support leg portions including support leg portions, which are paired with each other in a width direction of the mount portion and are connected to each other, the support leg portions, each of which is shaped into a bar extending from a proximal end to a distal end, the proximal end being mounted to a rear surface of the mount portion so as to be pivotable about a pivot axis extending along the width direction of the mount portion; and
paired brace portions including brace portions, which are paired with each other in the width direction of the mount portion and are connected to each other, the brace portions, each of which is shaped into a bar extending from a proximal end to a distal end, the proximal end being mounted to the rear surface of the mount portion so as to be pivotable about a pivot axis extending along the width direction of the mount portion,
wherein the support device is configured to support, by a lower end of the mount portion and the distal ends of the support leg portions, the electronic equipment mounted on the mount portion under a state in which the electronic equipment is inclined rearward,
wherein the brace portions each include an anchor portion projecting from the distal end,
wherein the support leg portions each include:
a plurality of receiving seats, which intersect a pivoting direction, are formed in an upper surface that is opposed to each of the brace portions, have a recessed shape capable of receiving the anchor portion of each of the brace portions, and are arrayed in a longitudinal direction; and
a plurality of bowl-shaped hole portions, which are formed in each of inner side surfaces of the support leg portions that are parallel to the pivoting direction and are opposed to each other, the plurality of bowl-shaped hole portions being arrayed in the longitudinal direction so as to correspond to the plurality of receiving seats, respectively,
wherein the brace portions each include a biasing stud that is formed on an outer side surface opposed to the inner side surface of each of the support leg portions and located nearer to the distal end than to the proximal end, projects toward an outer side in the width direction of the mount portion under a state of being biased, and includes a hemispherical tip,
wherein, when the anchor portion is received in any one of the plurality of receiving seats of each of the support leg portions, the biasing stud enters the bowl-shaped hole portion corresponding to the receiving seat in which the anchor portion is received,
wherein the brace portions are configured to keep an angle of the support leg portions with respect to the mount portion when the anchor portion is received in any one of the plurality of receiving seats of each of the support leg portions and the biasing stud enters the bowl-shaped hole portion corresponding to the receiving seat in which the anchor portion is received, and
wherein the brace portions are configured to be capable of changing the angle of the support leg portions with respect to the mount portion when the anchor portion having been received in any one of the plurality of receiving seats of each of the support leg portions is disengaged from the receiving seat along with an operation of causing the paired brace portions to pivot, and the biasing stud having entered the bowl-shaped hole portion is removed from the bowl-shaped hole portion and thus slides on the inner side surface of each of the support leg portions.

2. The support device for electronic equipment according to claim 1,
wherein each of the support leg portions further includes a rib that projects from an edge of the inner side surface adjacent to the upper surface toward an inner side in the width direction of the mount portion, and extends in the longitudinal direction,
wherein the rib includes a cutout portion formed nearer to the proximal end of each of the support leg portions than to the distal end,
wherein the rib is configured to prevent the biasing stud of each of the brace portions from slipping off the inner side surface while sliding on the inner side surface, and
wherein the cutout portion is configured to allow the biasing stud of each of the brace portions to arrive on the inner side surface through the cutout portion, and allow the biasing stud to be disengaged from the inner side surface through the cutout portion.

3. The support device for electronic equipment according to claim 2, wherein each of the support leg portions includes a partition portion that is formed at a position closer to the distal end than the receiving seat formed closest to the distal end among the plurality of receiving seats, and is configured to interfere with the anchor portion of each of the brace portions when the angle of the support leg portions with respect to the mount portion is changed.

4. The support device for electronic equipment according to claim 3,
wherein the support device is configured to be capable of placing the electronic equipment mounted on the mount portion so that the electronic equipment is laid on a table in such a manner that the paired support leg portions and the paired brace portions are folded so as to be parallel to the rear surface of the mount part,
wherein each of the support leg portions further includes:
an anchor accommodation portion, which is formed in the upper surface, and has a recessed shape capable of accommodating the anchor portion of each of the brace portions folded so as to be parallel to the rear surface of the mount portion when the support leg portions are folded so as to be parallel to the rear surface of the mount part; and a folding bowl-shaped hole portion, which is formed in the inner side surface, and is formed so as to correspond to the anchor accommodation portion, and wherein the brace portions are configured to keep an opening angle of the support leg portions with respect to the rear surface of the mount portion so that the support leg portions are parallel to the rear surface of the mount portion in such a manner that, when the brace portions are folded so as to be parallel to the rear surface of the mount part, the anchor portion is accommodated in the anchor accommodation portion of each of the support leg portions, and the biasing stud enters the folding bowl-shaped hole portion.

5. The support device for electronic equipment according to claim 3, wherein the mount portion includes lead-out cutout portions that are formed in a lower end and both side surfaces of the lower end of the mount part, and are configured to lead out cables to be connected to the electronic equipment, and wherein the lead-out cutout portions are formed to have such a position, a shape, and a size as to be prevented from being closed by a table surface, the paired support leg portions, and the paired brace portions when the electronic equipment mounted on the mount portion is supported on the table under a state of being inclined rearward, and when the electronic equipment mounted on the mount portion is placed in a laid state on the table.

6. The support device for electronic equipment according to claim 2, wherein the support device is configured to be capable of placing the electronic equipment mounted on the mount portion so that the electronic equipment is laid on a table in such a manner that the paired support leg portions and the paired brace portions are folded so as to be parallel to the rear surface of the mount part, wherein each of the support leg portions further includes:
an anchor accommodation portion, which is formed in the upper surface, and has a recessed shape capable of accommodating the anchor portion of each of the brace portions folded so as to be parallel to the rear surface of the mount portion when the support leg portions are folded so as to be parallel to the rear surface of the mount part; and
a folding bowl-shaped hole portion, which is formed in the inner side surface, and is formed so as to correspond to the anchor accommodation portion, and wherein the brace portions are configured to keep an opening angle of the support leg portions with respect to the rear surface of the mount portion so that the support leg portions are parallel to the rear surface of the mount portion in such a manner that, when the brace portions are folded so as to be parallel to the rear surface of the mount part, the anchor portion is accommodated in the anchor accommodation portion of each of the support leg portions, and the biasing stud enters the folding bowl-shaped hole portion.

7. The support device for electronic equipment according to claim 6, wherein the mount portion includes lead-out cutout portions that are formed in a lower end and both side surfaces of the lower end of the mount part, and are configured to lead out cables to be connected to the electronic equipment, and wherein the lead-out cutout portions are formed to have such a position, a shape, and a size as to be prevented from being closed by a table surface, the paired support leg portions, and the paired brace portions when the electronic equipment mounted on the mount portion is supported on the table under a state of being inclined rearward, and when the electronic equipment mounted on the mount portion is placed in a laid state on the table.

8. The support device for electronic equipment according to claim 1, wherein each of the support leg portions includes a partition portion that is formed at a position closer to the distal end than the receiving seat formed closest to the distal end among the plurality of receiving seats, and is configured to interfere with the anchor portion of each of the brace portions when the angle of the support leg portions with respect to the mount portion is changed.

9. The support device for electronic equipment according to claim 8, wherein the mount portion includes lead-out cutout portions that are formed in a lower end and both side surfaces of the lower end of the mount portion, and are configured to lead out cables to be connected to the electronic equipment, and wherein the lead-out cutout portions are formed to have such a position, a shape, and a size as to be prevented from being closed by a table surface, the paired support leg portions, and the paired brace portions when the electronic equipment mounted on the mount portion is supported on the table under a state of being inclined rearward, and when the electronic equipment mounted on the mount portion is placed in a laid state on the table.

10. The support device for electronic equipment according to claim 8, wherein the support device is configured to be capable of placing the electronic equipment mounted on the mount portion so that the electronic equipment is laid on a table in such a manner that the paired support leg portions and the paired brace portions are folded so as to be parallel to the rear surface of the mount part, wherein each of the support leg portions further includes:
an anchor accommodation portion, which is formed in the upper surface, and has a recessed shape capable of accommodating the anchor portion of each of the brace portions folded so as to be parallel to the rear surface of the mount portion when the support leg portions are folded so as to be parallel to the rear surface of the mount part; and
a folding bowl-shaped hole portion, which is formed in the inner side surface, and is formed so as to correspond to the anchor accommodation portion, and wherein the brace portions are configured to keep an opening angle of the support leg portions with respect to the rear surface of the mount portion so that the support leg portions are parallel to the rear surface of the mount portion in such a manner that, when the brace portions are folded so as to be parallel to the rear surface of the mount part, the anchor portion is accommodated in the anchor accommodation portion of each of the support leg portions, and the biasing stud enters the folding bowl-shaped hole portion.

11. The support device for electronic equipment according to claim 1, wherein the support device is configured to be capable of placing the electronic equipment mounted on the mount portion so that the electronic equipment is laid on a table in such a manner that the paired support leg portions and the paired brace portions are folded so as to be parallel to the rear surface of the mount portion,
wherein each of the support leg portions further includes:
an anchor accommodation portion, which is formed in the upper surface, and has a recessed shape capable of accommodating the anchor portion of each of the brace portions folded so as to be parallel to the rear surface of the mount portion when the support leg portions are folded so as to be parallel to the rear surface of the mount portion; and
a folding bowl-shaped hole portion, which is formed in the inner side surface, and is formed so as to correspond to the anchor accommodation portion, and
wherein the brace portions are configured to keep an opening angle of the support leg portions with respect to the rear surface of the mount portion so that the support leg portions are parallel to the rear surface of the mount portion in such a manner that, when the brace portions are folded so as to be parallel to the rear surface of the mount portion, the anchor portion is accommodated in the anchor accommodation portion of each of the support leg portions, and the biasing stud enters the folding bowl-shaped hole portion.

12. The support device for electronic equipment according to claim 11
wherein the mount portion includes lead-out cutout portions that are formed in a lower end and both side surfaces of the lower end of the mount part, and are configured to lead out cables to be connected to the electronic equipment, and
wherein the lead-out cutout portions are formed to have such a position, a shape, and a size as to be prevented from being closed by a table surface, the paired support leg portions, and the paired brace portions when the electronic equipment mounted on the mount portion is supported on the table under a state of being inclined rearward, and when the electronic equipment mounted on the mount portion is placed in a laid state on the table.

13. An electronic equipment, comprising:
a casing;
paired support leg portions including support leg portions, which are paired with each other in a width direction of the casing and are connected to each other, the support leg portions, each of which is shaped into a bar extending from a proximal end to a distal end, the proximal end being mounted to a rear surface of the casing so as to be pivotable about a pivot axis extending along the width direction of the casing; and
paired brace portions including brace portions, which are paired with each other in the width direction of the casing and are connected to each other, the brace portions, each of which is shaped into a bar extending from a proximal end to a distal end, the proximal end being mounted to the rear surface of the casing so as to be pivotable about a pivot axis extending along the width direction of the casing,
wherein the support device is configured to support, by a lower end of the casing and the distal ends of the support leg portions, the casing under a state in which the casing is inclined rearward,
wherein the brace portions each include an anchor portion projecting from the distal end,
wherein the support leg portions each include:
a plurality of receiving seats, which intersect a pivoting direction, are formed in an upper surface that is opposed to each of the brace portions, have a recessed shape capable of receiving the anchor portion of each of the brace portions, and are arrayed in a longitudinal direction; and
a plurality of bowl-shaped hole portions, which are formed in each of inner side surfaces of the support leg portions that are parallel to the pivoting direction and are opposed to each other, the plurality of bowl-shaped hole portions being arrayed in the longitudinal direction so as to correspond to the plurality of receiving seats, respectively,
wherein the brace portions each include a biasing stud that is formed on an outer side surface opposed to the inner side surface of each of the support leg portions and located nearer to the distal end than to the proximal end, projects toward an outer side in the width direction of the casing under a state of being biased, and includes a hemispherical tip,
wherein, when the anchor portion is received in any one of the plurality of receiving seats of each of the support leg portions, the biasing stud enters the bowl-shaped hole portion corresponding to the receiving seat in which the anchor portion is received,
wherein the brace portions are configured to keep an angle of the support leg portions with respect to the casing when the anchor portion is received in any one of the plurality of receiving seats of each of the support leg portions and the biasing stud enters the bowl-shaped hole portion corresponding to the receiving seat in which the anchor portion is received, and
wherein the brace portions are configured to be capable of changing the angle of the support leg portions with respect to the casing when the anchor portion having been received in any one of the plurality of receiving seats of each of the support leg portions is disengaged from the receiving seat along with an operation of causing the paired brace portions to pivot, and the biasing stud having entered the bowl-shaped hole portion is removed from the bowl-shaped hole portion and thus slides on the inner side surface of each of the support leg portions.

14. The electronic equipment according to claim 13,
wherein each of the support leg portions further includes a rib that projects from an edge of the inner side surface adjacent to the upper surface toward an inner side in the width direction of the casing, and extends in the longitudinal direction,
wherein the rib includes a cutout portion formed nearer to the proximal end of each of the support leg portions than to the distal end,
wherein the rib is configured to prevent the biasing stud of each of the brace portions from slipping off the inner side surface while sliding on the inner side surface, and
wherein the cutout portion is configured to allow the biasing stud of each of the brace portions to arrive on the inner side surface through the cutout portion, and allow the biasing stud to be disengaged from the inner side surface through the cutout portion.

15. The electronic equipment according to claim 14,
wherein each of the support leg portions includes a partition portion that is formed at a position closer to the distal end than the receiving seat formed closest to the distal end among the plurality of receiving seats, and is configured to interfere with the anchor portion of each of the brace portions when the angle of the support leg portions with respect to the casing is changed.

16. The electronic equipment according to claim 15,
wherein the casing is configured to be placed so that the casing is laid on a table in such a manner that the paired support leg portions and the paired brace portions are folded so as to be parallel to the rear surface of the casing,
wherein each of the support leg portions further includes:
an anchor accommodation portion, which is formed in the upper surface, and has a recessed shape capable of accommodating the anchor portion of each of the brace portions folded so as to be parallel to the rear surface of the casing when the support leg portions are folded so as to be parallel to the rear surface of the casing; and
a folding bowl-shaped hole portion, which is formed in the inner side surface, and is formed so as to correspond to the anchor accommodation portion, and
wherein the brace portions are configured to keep an opening angle of the support leg portions with respect to the rear surface of the casing so that the support leg portions are parallel to the rear surface of the casing in such a manner that, when the brace portions are folded so as to be parallel to the rear surface of the casing, the anchor portion is accommodated in the anchor accommodation portion of each of the support leg portions, and the biasing stud enters the folding bowl-shaped hole portion.

17. The electronic equipment according to claim 14,
wherein the casing is configured to be placed so that the casing is laid on a table in such a manner that the paired support leg portions and the paired brace portions are folded so as to be parallel to the rear surface of the casing,
wherein each of the support leg portions further includes:
an anchor accommodation portion, which is formed in the upper surface, and has a recessed shape capable of accommodating the anchor portion of each of the brace portions folded so as to be parallel to the rear surface of the casing when the support leg portions are folded so as to be parallel to the rear surface of the casing; and
a folding bowl-shaped hole portion, which is formed in the inner side surface, and is formed so as to correspond to the anchor accommodation portion, and
wherein the brace portions are configured to keep an opening angle of the support leg portions with respect to the rear surface of the casing so that the support leg portions are parallel to the rear surface of the casing in such a manner that, when the brace portions are folded so as to be parallel to the rear surface of the casing, the anchor portion is accommodated in the anchor accommodation portion of each of the support leg portions, and the biasing stud enters the folding bowl-shaped hole portion.

18. The electronic equipment according to claim 13,
wherein each of the support leg portions includes a partition portion that is formed at a position closer to the distal end than the receiving seat formed closest to the distal end among the plurality of receiving seats, and is configured to interfere with the anchor portion of each of the brace portions when the angle of the support leg portions with respect to the casing is changed.

19. The electronic equipment according to claim 18,
wherein the casing is configured to be placed so that the casing is laid on a table in such a manner that the paired support leg portions and the paired brace portions are folded so as to be parallel to the rear surface of the casing,
wherein each of the support leg portions further includes:
an anchor accommodation portion, which is formed in the upper surface, and has a recessed shape capable of accommodating the anchor portion of each of the brace portions folded so as to be parallel to the rear surface of the casing when the support leg portions are folded so as to be parallel to the rear surface of the casing; and
a folding bowl-shaped hole portion, which is formed in the inner side surface, and is formed so as to correspond to the anchor accommodation portion, and
wherein the brace portions are configured to keep an opening angle of the support leg portions with respect to the rear surface of the casing so that the support leg portions are parallel to the rear surface of the casing in such a manner that, when the brace portions are folded so as to be parallel to the rear surface of the casing, the anchor portion is accommodated in the anchor accommodation portion of each of the support leg portions, and the biasing stud enters the folding bowl-shaped hole portion.

20. The electronic equipment according to claim 13,
wherein the casing is configured to be placed so that the casing is laid on a table in such a manner that the paired support leg portions and the paired brace portions are folded so as to be parallel to the rear surface of the casing,
wherein each of the support leg portions further includes:
an anchor accommodation portion, which is formed in the upper surface, and has a recessed shape capable of accommodating the anchor portion of each of the brace portions folded so as to be parallel to the rear surface of the casing when the support leg portions are folded so as to be parallel to the rear surface of the casing; and
a folding bowl-shaped hole portion, which is formed in the inner side surface, and is formed so as to correspond to the anchor accommodation portion, and
wherein the brace portions are configured to keep an opening angle of the support leg portions with respect to the rear surface of the casing so that the support leg portions are parallel to the rear surface of the casing in such a manner that, when the brace portions are folded so as to be parallel to the rear surface of the casing, the anchor portion is accommodated in the anchor accommodation portion of each of the support leg portions, and the biasing stud enters the folding bowl-shaped hole portion.

* * * * *